United States Patent
Watanabe et al.

(10) Patent No.: US 12,541,096 B2
(45) Date of Patent: Feb. 3, 2026

(54) OPTICAL LINE SENSOR

(71) Applicant: VIENEX CORPORATION, Kanonji (JP)

(72) Inventors: Ryuta Watanabe, Kanonji (JP); Osamu Iwasaki, Kanonji (JP)

(73) Assignee: VIENEX CORPORATION, Kagawa (JP)

( * ) Notice: Subject to any disclaimer, the term of this patent is extended or adjusted under 35 U.S.C. 154(b) by 473 days.

(21) Appl. No.: 18/265,221

(22) PCT Filed: Oct. 1, 2021

(86) PCT No.: PCT/JP2021/036486
§ 371 (c)(1),
(2) Date: Jun. 2, 2023

(87) PCT Pub. No.: WO2022/130736
PCT Pub. Date: Jun. 23, 2022

(65) Prior Publication Data
US 2024/0027750 A1 Jan. 25, 2024

(30) Foreign Application Priority Data
Dec. 15, 2020 (JP) .................................. 2020-207542

(51) Int. Cl.
*G02B 15/00* (2006.01)
*G01N 21/88* (2006.01)
*G02B 26/12* (2006.01)

(52) U.S. Cl.
CPC ....... *G02B 26/125* (2013.01); *G01N 21/8806* (2013.01); *G01N 21/8851* (2013.01); *G02B 26/123* (2013.01)

(58) Field of Classification Search
CPC ... G02B 26/125; G02B 15/00; G01N 21/8806
See application file for complete search history.

(56) References Cited

U.S. PATENT DOCUMENTS

2001/0028506 A1* 10/2001 Fujimoto ............. G02B 3/0068
359/620
2005/0041284 A1 2/2005 Tamura
(Continued)

FOREIGN PATENT DOCUMENTS

EP 0596644 5/1994
EP 000596664 5/1994
(Continued)

OTHER PUBLICATIONS

Office Action in Korean Patent Application No. 10-2023-7019890, issued Feb. 12, 2025 (16 pages); English machine translation (7 pages).

(Continued)

*Primary Examiner* — Ibrahim Siddo
(74) *Attorney, Agent, or Firm* — Andrew F. Young, Esq.; Nolte Lackenbach Siegel

(57) ABSTRACT

An optical line sensor reads an inspection object conveyed in a sub-scanning direction by a reading line L extending in a main scanning direction and includes a plurality of light-receiving lenses 11 and a plurality of light-receiving elements. The plurality of light-receiving lenses 11 are arranged along the main scanning direction. The plurality of light-receiving elements are arranged linearly along the main scanning direction, and receive light transmitted through the plurality of light-receiving lenses 11. The plurality of light-receiving lenses 11 are arranged to be separated from each other by a diameter of the light-receiving lens 11 or longer. A plurality of light-receiving elements 121 form at least one row or more of the reading lines L.

18 Claims, 34 Drawing Sheets

(56) References Cited

U.S. PATENT DOCUMENTS

| | | | |
|---|---|---|---|
| 2010/0238520 A1* | 9/2010 | Nagata | H04N 1/0318 358/475 |
| 2018/0262638 A1 | 9/2018 | Ohzawa et al. | |
| 2020/0310003 A1 | 10/2020 | Asano et al. | |

FOREIGN PATENT DOCUMENTS

| | | |
|---|---|---|
| JP | H05-14600 A | 1/1993 |
| JP | 2009-244500 A | 10/2009 |
| JP | 2009-246623 A | 10/2009 |
| JP | 2018-019334 A | 2/2018 |
| JP | 2018-022948 A | 2/2018 |
| JP | 2018-152713 A | 9/2018 |
| KR | 10-2005-0009679 A | 1/2005 |

OTHER PUBLICATIONS

EP 21906100.9, Extended European Search Report dated Apr. 26, 2024, 9 pages—English.
PCT/2021/036486, International Search Report and Written Opinion dated Dec. 15. 2020, 8 pages—Japanese, 8pages—English.

* cited by examiner

OPTICAL LINE SENSOR

CROSS REFERENCE TO RELATED APPLICATIONS

This application relates to and claims priority from PCT Ser. No.: PCT/JP2021/036486 filed Oct. 1, 2021, the entire contents of which are incorporated herein by reference, which in turn claims priority to JP Ser. No.: 2020-207542 filed Dec. 15, 2020.

TECHNICAL FIELD

The present invention relates to an optical line sensor that mainly detects a scratch and a defect on a surface of a thin inspection object such as a printed matter or a film and a scratch and a defect inside a transparent film.

BACKGROUND ART

Studies have been made on application of a contact-type optical sensor (hereinafter, referred to as CIS), which has been used in an inspection machine for discriminating authenticity of a banknote or flatbed scanners such as a copying machine for business use or a printer scanner for hoe use, to what is called a surface inspection machine for inspection targets, such as checking printing performance of a printed matter, surface inspection in a manufacturing process of a thin and wide film product, inspection of labels attached to various beverage containers, food containers, cans, and the like, and some of the sensors have been commercially available.

However, a CIS to which a SELFOC® lens is applied still has a short operation distance (hereinafter, referred to as W.D.), and a CIS with long W.D. is desired in order to avoid contact in a scene used in a process. In addition, in inspection of paper sheets such as a banknote, a CIS with a relatively shallow depth of field has withstood use, but in a manufacturing process of the inspection object, a CIS having a deep depth of field is also strongly desired due to a large fluctuation in an optical axis direction of the inspection object.

A typical CIS having a deep depth of field is a telecentric optical system using a mirror optical system as shown in Patent Documents 1 to 5. The patent documents show that the optical system is extremely complicated. It is very difficult to manufacture the optical system and operate the optical system as a product. That is, at the time of manufacturing, the process becomes complicated, and manufacturing stability and cost increase become problems. Further, even after commercialization, there is still problems, such as that an optical axis is deviated since the optical system is a complicated optical system depending on a change in environment or a change with time, and performance is easily deteriorated as compared with a CIS having a conventional simple structure.

In view of the above, it is conceivable to improve W.D. and a depth of field by using a refractive lens using glass or resin without using the telecentric reflection optical system. As for an optical system of the refractive system, a certain level of solution has been proposed as shown in Patent Documents 6 and 7. For example, Patent Document 6 attempts to realize an optical system having a deep depth of field by arranging one telecentric refractive optical system apart from a line sensor arranged in a staggered manner and arranging lenses as the refractive optical system apart from each other to form an array. Further, in Patent Document 7, a method of preventing crosstalk between lenses by providing a partition plate between separated lenses has been studied. In Patent Document 6 and Patent Document 7 described above, it is possible to improve a depth of field and prevent crosstalk between lenses, but a general telecentric refractive optical system is large and is difficult to be made compact. Further, in the partition plate shown in Patent Document 7, a missing pixel occurs at the time of reading, and reading becomes incomplete. Furthermore, a solution for shading that one lens has in principle caused by lenses being separated from each other is not shown. A method of preventing what is called a ripple in a reading line direction is also not mentioned. Moreover, the refractive optical system method has not been realized up to the present.

Furthermore, an inspection machine using a camera lens such as a line camera, which is in a method different from the above method, is large, and a large number of inspection machines are required in order to support a wide inspection object at a manufacturing site. For this reason, since the entire device becomes extremely large and the cost of the device is enormous, it is difficult to arrange the device in each process in a factory.

In order to solve the above problem, there is demand for an optical line sensor including an illumination system that is compact and inexpensive that can be introduced into each process in a factory, uses a new refractive system lens having long W.D. and a deep depth of field, and uses a new prevention method for a ripple that is optical unevenness on a light-receiving sensor due to shading of each lens.

PRIOR ART DOCUMENTS

Patent Documents

Patent Document 1: JP 2018-019334 A
Patent Document 2: JP 2018-152713 A
Patent Document 3: JP 2009-244500 A
Patent Document 4: JP 2018-019334 A
Patent Document 5: JP 2018-022948 A
Patent Document 6: JP 2009-246623 A
Patent Document 7: JP H05-14600 A

SUMMARY OF THE INVENTION

Problems to be Solved by the Invention

In Patent Documents 1 to 5, a complicated telecentric optical system of a mirror system is used. Since the optical system is complicated, there are various problems such as manufacturing stability, cost increase, deviation of an optical axis with respect to a surrounding environment, increase in a temporal change amount, and durability. Further, in Patent Documents 6 and 7, a separate lens array of a refractive system is used, but a telecentric refractive optical system is large and is difficult to be made compact. Further, a preventive measure against occurrence of unevenness (ripple) in light intensity distribution in a reading line direction by preventing shading caused by an individual lens is incomplete, and dissatisfaction remains in securing a dynamic range of a line sensor.

In view of the above, an object of the present invention is to realize an optical line sensor that is durable with a small temporal change amount by eliminating a complicated optical system and securing high performance with a long operation distance (W. D.) and high resolution by a simple optical system. Further, it is also an object of the present invention to realize an illumination optical system that can more effectively secure a dynamic range of a line sensor even when a refractive optical system is used.

Means for Solving the Problems

An optical line sensor according to the present invention is an optical line sensor that reads an inspection object conveyed in a sub-scanning direction by a reading line extending in a main scanning direction and includes a plurality of light-receiving lenses and a plurality of light-receiving elements. A plurality of the light-receiving lenses are arranged along the main scanning direction. A plurality of the light-receiving elements are arranged linearly along the main scanning direction, and receive light transmitted through a plurality of the light-receiving lenses. A plurality of the light-receiving lenses is arranged to be separated from each other by a diameter of the light-receiving lens or more. A plurality of the light-receiving elements forms at least one row or more of the reading lines.

Effects of the Invention

According to the present invention, as compared with a conventional trefoil stacking system of a multi-eye lens, in a case where an optional light-receiving lens is focused, an optical axis of another light-receiving lens does not intersect an optical axis of the light-receiving lens. Further, if light-receiving lenses are arranged to be separated from each other by about a visual field dimension in an arrangement direction of the light-receiving lenses so that visual fields do not overlap each other, or if output of a superimposed portion in image synthesis is corrected, a depth of field unique to one light-receiving lens can be secured. Therefore, it is possible to realize an optical line sensor having a large depth of field. Further, if a plurality of rows of light-receiving element arrays is arranged in parallel with the main scanning direction and to be separated apart from each other in the sub-scanning direction by a visual field of each light-receiving lens or more, arrangement can be made by appropriately increasing an effective diameter of the light-receiving lens, so that an amount of received light can be secured, and a depth of field, which has not been able to be realized conventionally, can be secured. Moreover, in a case where a light-receiving lens system is a reduction optical system, if the reduction optical system is similarly separated by about a visual field dimension of a light-receiving lens, and a pixel dimension of the light-receiving element is reduced in size according to magnification, a depth of field can be increased, and at the same time, resolution can be improved as compared with an equal magnification optical system. That is, detection resolution of an inspection object is further improved as compared with the prior art.

MODE FOR CARRYING OUT THE INVENTION

1. Overall Configuration of Optical Line Sensor

Figure 1:
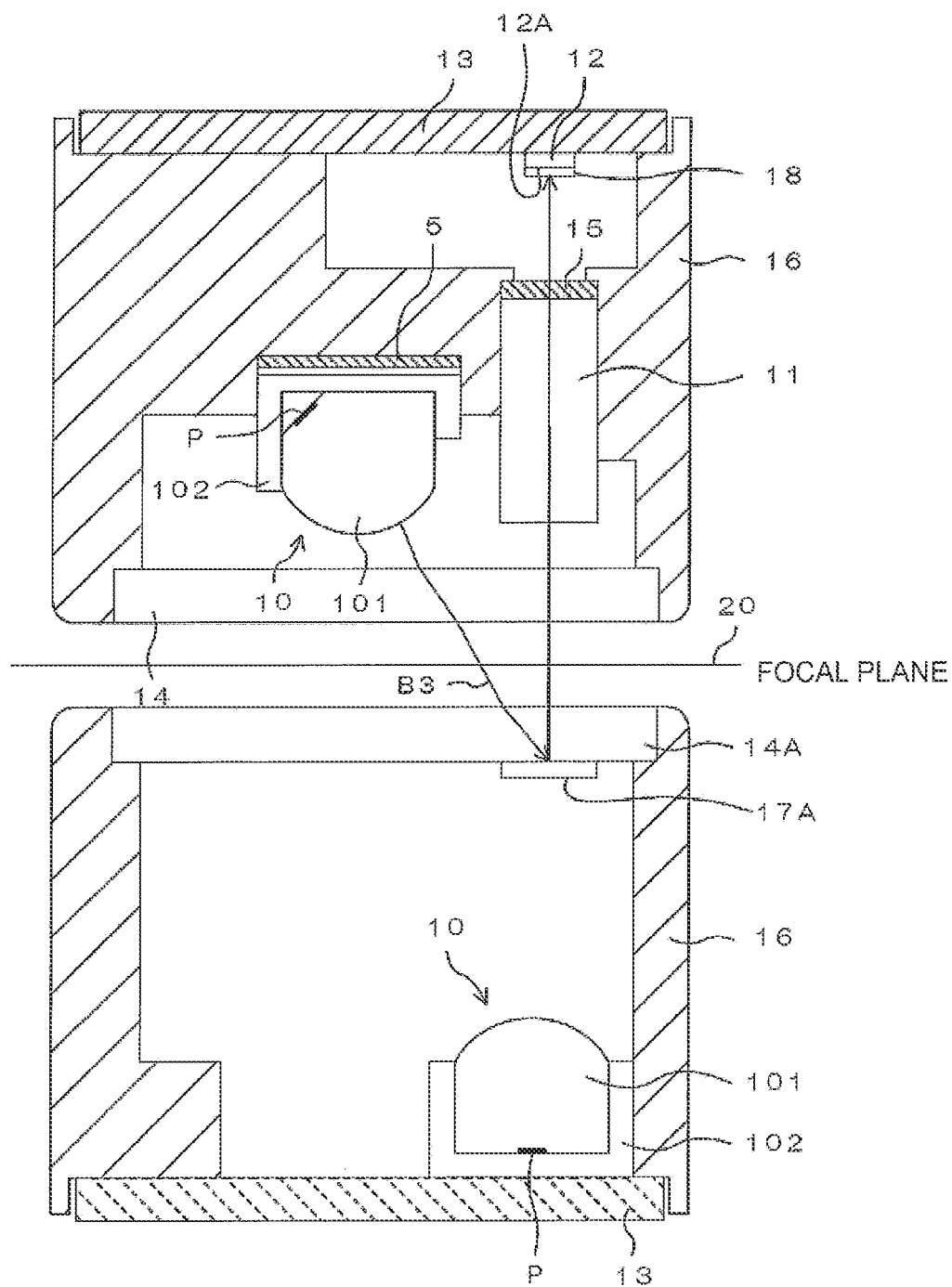
FIG. 1 is a cross-sectional view of a typical CIS.
Figure 2:
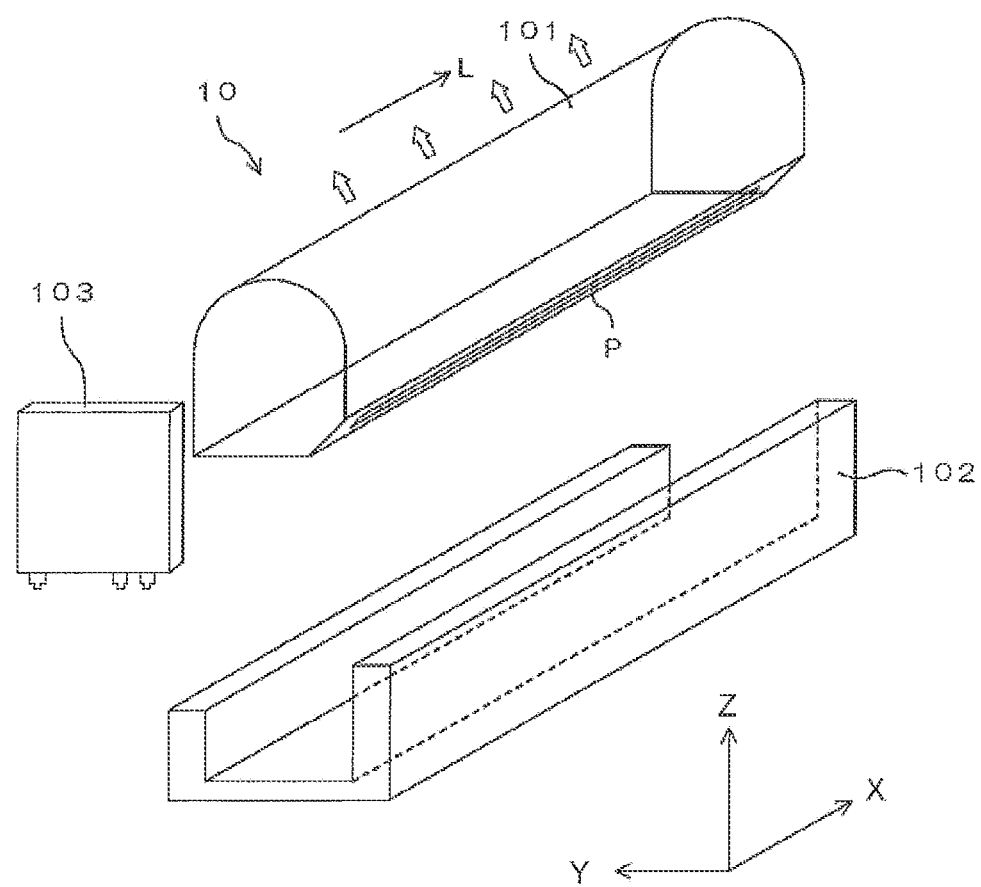
FIG. 2 is an exploded perspective view of a linear illumination optical system for a conventional CIS.

A typical CIS is illustrated in FIG. 1, and a linear illumination optical system for a CIS is similarly illustrated in FIG. 2. FIG. 1 is a cross-sectional view of a portion in the vicinity of a center portion in a longitudinal direction of a CIS. On the other hand, FIG. 2 is an exploded perspective view. An X direction is a main scanning direction, and a Y direction is a sub-scanning direction. AZ direction is orthogonal to the X direction and the Y direction. Alight source unit 10 having a linear shape is an illumination optical system having light amount distribution elongated in the main scanning direction.

In the CIS illustrated in FIG. 1, two housings 16 are arranged to face each other across a focal plane (inspection surface) 20. In each of the housings 16, the light source unit 10 having a linear shape for illuminating an inspection object on the focal plane 20 is provided. In one of the housings 16, a light-receiving lens 11 and a light-receiving unit 12 are provided, and light from an illuminated inspection object is guided to the light-receiving unit 12 by the light-receiving lens 11. The light-receiving lens 11 is an optical element that forms an image of light from an inspection object on the light-receiving unit 12. In the CIS illustrated in FIG. 1, one of two of the light source units 10 is arranged on the light-receiving unit 12 side with respect to the focal plane 20, and the other is arranged on the opposite side to the light-receiving unit 12 side.

The light-receiving unit 12 is mounted on a substrate 13 fixed to one of the housings 16. Light having passed through the light-receiving lens 11 is received by a light-receiving surface 12A of the light-receiving unit 12, and a signal corresponding to an amount of received light is output from the light-receiving unit 12. When an inspection object is conveyed in one direction Y along the focal plane 20, light from the inspection object is continuously received by the light-receiving unit 12, and an image (color image, fluorescence image, or the like) of the inspection object is obtained based on an output signal from the light-receiving unit 12. As described above, an inspection object conveyed in the sub-scanning direction (Y direction) is read by the light-receiving unit 12 extending in the main scanning direction (X direction) on a reading line configured by the light-receiving surface 12A of the light-receiving unit 12.

Light B3 emitted from one of the light source units 10 passes through protective glass 14 fixed to the housing 16, is reflected by a reflecting member 17A provided on an inner surface of protective glass 14A fixed to the other one of the housings 16 and is guided to the focal plane 20. An ultraviolet light blocking filter (UV cut filter) 15 that prevents ultraviolet light from entering the light-receiving unit 12 is provided at an optional position from the focal plane 20 to the light-receiving unit 12. Further, a color filter 18 that allows visible light in a specific wavelength range to pass through is provided between the light-receiving unit 12 and the ultraviolet light blocking filter 15. At a position facing a bottom surface of the light source unit 10 in one of the housings 16, a substrate 5 for fixing a light source 103 (ultraviolet light source, visible light source, or the like) provided in the light source unit 10 is installed.

In the example illustrated in FIGS. 1 and 2, the light source unit 10 includes a transparent light guide body 101 extending along a longitudinal direction L, the light source 103 provided in the vicinity of one end surface in the longitudinal direction L, and a cover member 102 for holding each side surface of the light guide body 101. Light emitted from the light source 103 is incident on the light guide body 101, appropriately reflected in a light diffusion pattern P while propagating in the light guide body 101 and emitted from a light exit surface in an arrow direction to illuminate an inspection object as linear illumination light. A depth of field of such a CIS is small, and in a case where an inspection object is thick, it is difficult to perform an inspection in the entire thickness direction, and, since W.D. is narrow, the CIS comes into contact with the inspection object, and the inspection itself is not performed in many cases.

In the CIS as described above, for example, a SELFOC® (manufactured by Nippon Sheet Glass Corporation) lens array is used as the light-receiving lens 11. The SELFOC® lens array is an upright equal-magnification lens array. In the lens array, cylindrical SELFOC® lenses are stacked in a trefoil shape to form a multi-eye lens. An advantage of the multi-eye lens is that what is called brightness of a lens can be made brighter than a single lens. That is, the F-number in a case where a plurality of single lenses is arranged to form a multi-eye lens is smaller than the F-number of a single lens. This is because the effective F-number is small at a position where a focal position of one lens at an optional position coincides with a focal position of a lens around the lens. Conversely, in an upright lens system, it means that a numerical aperture (hereinafter referred to as N.A) is larger in arrayed lenses than a single lens. This property is a major reason why the SELFOC® lens array is used for a CIS.

An advantage of the CIS as described above is disadvantageous from the viewpoint of a depth of field and a depth of focus. As with a monocular lens, the larger the numerical aperture, the smaller a depth of field becomes. For example, in a microscope objective lens, it is well known that a depth of field decreases as the magnification increases, that is, N.A. increases. Further, also in a camera lens, in a distant view and a near view, a length of a depth of field is clearly shown, and adjustment is performed with a diaphragm in order to secure a depth of field. That is, N.A. is changed to obtain a desired depth of field. In addition, an upright multi-eye lens typified by the SELFOC® lens has a structure in which an image is likely blurred in a case where an inspection object changes in an optical axis direction as compared with a monocular lens because optical axes of lenses are different from each other and intersect each other. The above is a major disadvantage of a multi-eye SELFOC® lens array in a trefoil stacking system. In view of the above, as a result of examining how a depth of field of a compact optical line sensor can be increased, an obtained example will be described below.

2. Example of Light-Receiving System

Figure 3:
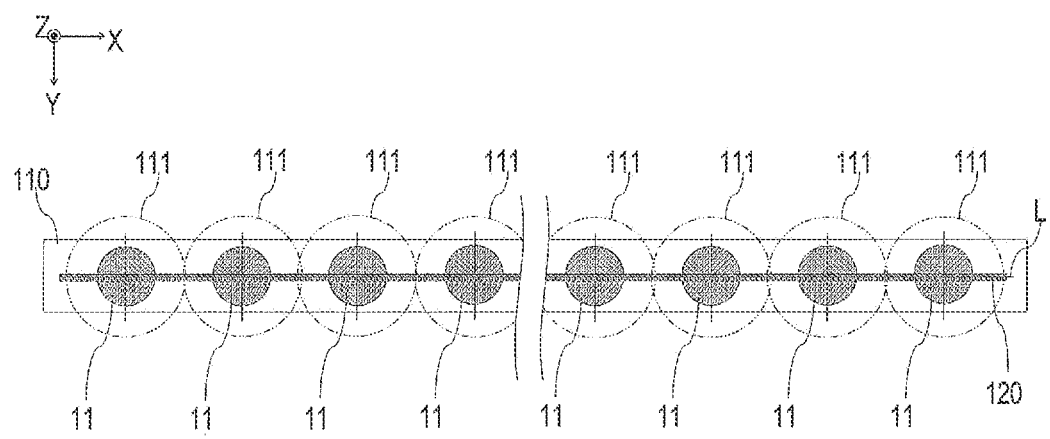
FIG. 3 is a schematic diagram of a light-receiving system in which visual fields of light-receiving lenses do not substantially overlap in a case where the light-receiving lenses are arranged to act as monocular lenses.

First, a first method is to form an array structure in which an optical line sensor can be regarded as being formed in a monocular lens as illustrated in FIG. 3. FIG. 3 is a schematic diagram of a light-receiving system in which visual fields 111 of the light-receiving lenses 11 do not substantially overlap. That is, in FIG. 3, the light-receiving lenses 11 are arranged in a manner separated from each other in the main scanning direction (X direction) so that the visual fields 111 of the light-receiving lenses 11 do not substantially overlap each other.

Figure 4:
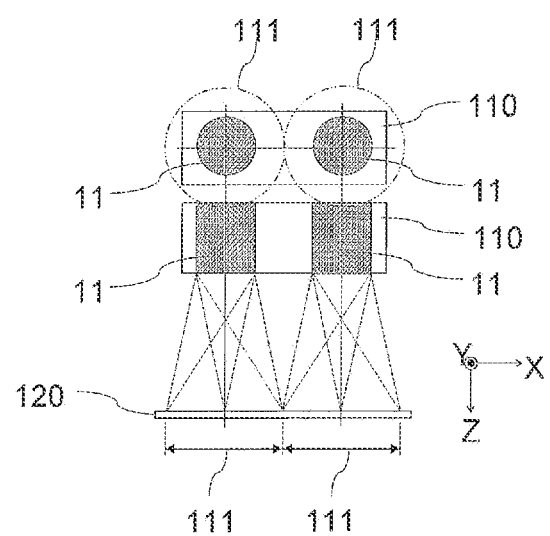
FIG. 4 is a side view illustrating a part of the light-receiving system in FIG. 3.

That is, instead of the trefoil stacking system, a plurality of the light-receiving lenses 11 arranged along the main scanning direction (X direction) are arranged in a manner separated from each other by a diameter of the light-receiving lens 11 or more. This is shown in FIG. 4. In FIG. 4, a part of the light-receiving system of FIG. 3 is illustrated in a side view, but a plan view of the part of the light-receiving system is also illustrated for visual clarity. A plurality of the light-receiving lenses 11 are integrally held by a lens holder 110. A light-receiving element array 120 formed of a plurality of light-receiving elements (not illustrated) arranged linearly along the main scanning direction (X direction) is arranged at a position facing a plurality of the light-receiving lenses 11 in the Z direction. That is, one light-receiving element array 120 is configured as a plurality of light-receiving elements are arranged in an array of one row. In this manner, a plurality of light-receiving elements form one reading line L. Each light-receiving element receives light transmitted through each of the light-receiving lenses 11.

A plurality of the light-receiving lenses 11 are preferably arranged in a manner separated from each other within a visual field dimension (within a visual field range) of the light-receiving lens 11. In this example, a plurality of the light-receiving lenses 11 are arranged to be separated from each other with substantially the same dimension as a visual field dimension of each of the light-receiving lenses 11, but visual field radii of the light-receiving lenses 11 may be placed on each other. In this case, subtraction processing is preferably performed for pixel output from the light-receiving element for a light-receiving element in a portion where the visual fields 111 of a plurality of the light-receiving lenses 11 overlap. For example, an image of one of the light-receiving lenses 11 (an amount of light received by one of the light-receiving lenses 1l) is preferably excluded from data output from the light-receiving element, or pixel output from the light-receiving element is preferably set to a substantially half output value at the time of image synthesis.

Further, by using a plurality of light-receiving element rows (light-receiving element array 120), occurrence of a missing pixel can be more reliably prevented than in a case of a light-receiving element row of one line. In a case of using a plurality of the light-receiving element arrays 120, the light-receiving element arrays 120 may be arranged to be separated in the sub-scanning direction (Y direction). In this case, a plurality of light-receiving elements are arranged in an array of a plurality of rows (for example, two rows) to constitute a plurality of the light-receiving element arrays 120, and form a plurality of rows of the reading lines L. A plurality of the light-receiving element arrays 120 may be of a multi-line system or may be of a system in which short light-receiving element rows are arranged in a staggered manner.

Figure 5:
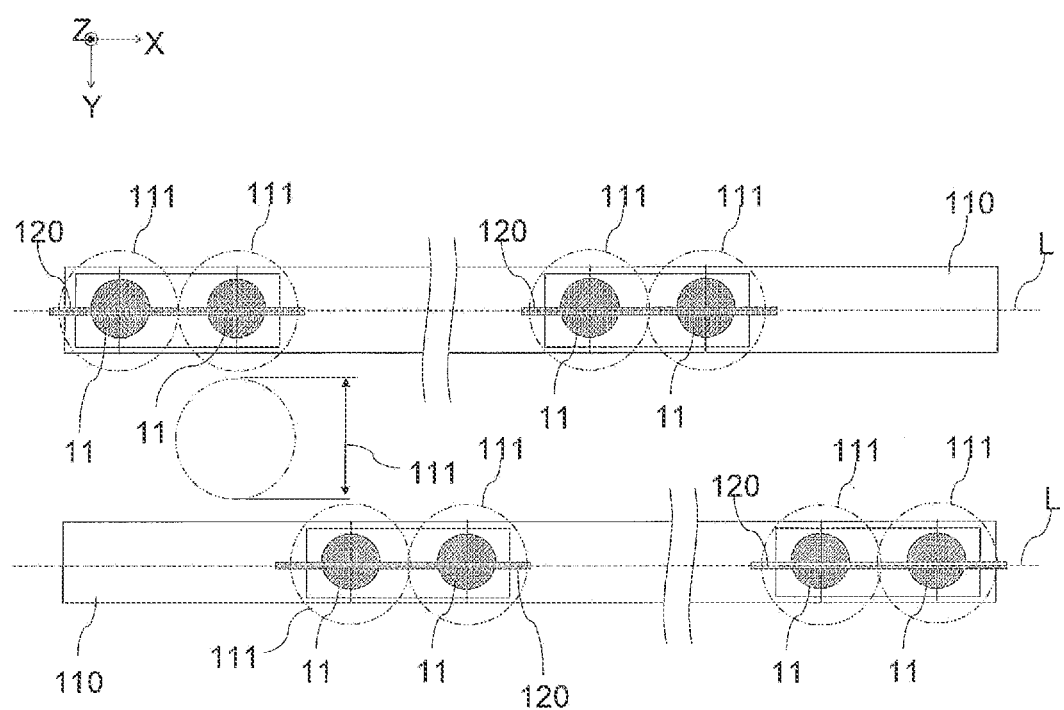
FIG. 5 is a schematic diagram illustrating an example of a light-receiving system in which a plurality of light-receiving element arrays is arranged.

FIG. 5 is a schematic diagram illustrating an example of a light-receiving system in which a plurality of the light-receiving element arrays 120 are arranged. In the example of FIG. 5, at least apart of a plurality of the light-receiving lenses 11 are arranged to be separated from each other by a visual field dimension of the light-receiving lens 11 or more in the main scanning direction (X direction), and at least two rows (two rows in this example) of the reading lines L are formed by the multi-line system. A separation distance of the light-receiving element arrays 120 in the sub-scanning direction (Y direction) is preferably larger than a visual field dimension of the light-receiving lens 11 as illustrated in FIG. 5. However, in a case of an upright lens system in which a plurality of the light-receiving lenses 11 form an erect image, the visual fields 111 may overlap. In this case, a position where the visual fields 111 overlap may be corrected in advance with a correction chart or the like for correcting pixel output from a light-receiving element. In this way, the visual fields 111 do not need to be placed on each other, and the optical line sensor can be made compact.

Figure 6A:
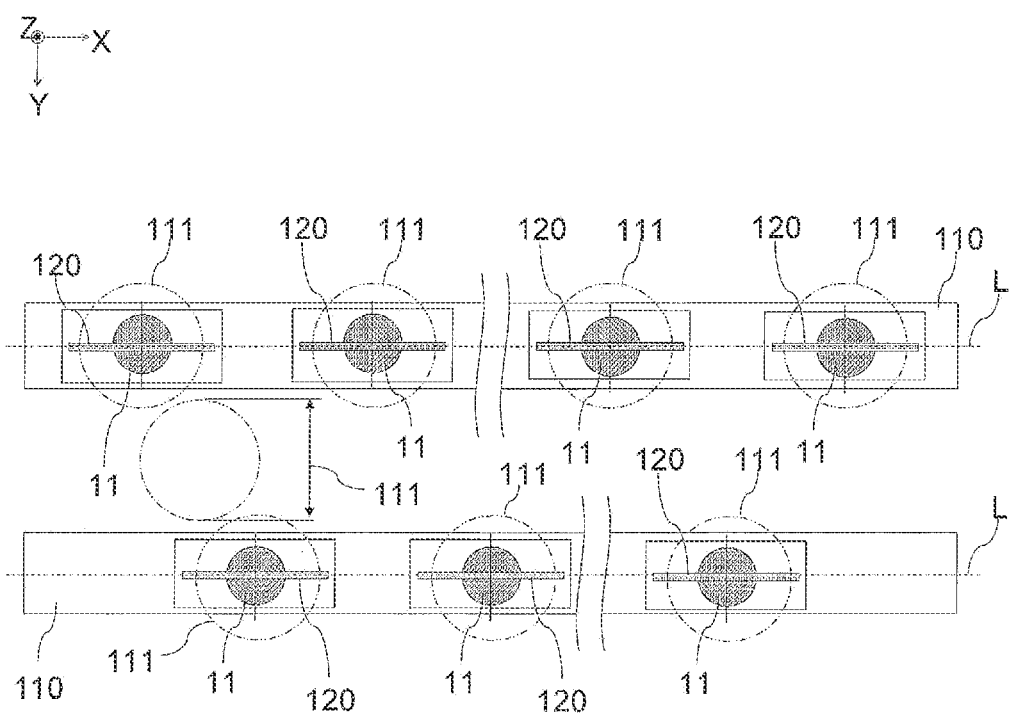
FIG. 6A is a schematic diagram illustrating another example of the light-receiving system in which a plurality of light-receiving element arrays is arranged.

FIG. 6A is a schematic diagram illustrating another example of a light-receiving system in which a plurality of the light-receiving element arrays 120 are arranged. In FIG. 6A, the light-receiving element arrays 120 including a short sensor are arranged in a staggered manner so as to be separated from each other by the visual field 111 of the light-receiving lens 11 or more in the sub-scanning direction (Y direction). As illustrated in FIG. 6A, by making one of the light-receiving lenses 11 correspond to one of the light-receiving element arrays 120, a plurality of the light-receiving lenses 11 may be arranged as many as the number corresponding to a plurality of the light-receiving element arrays 120. An optical axis of each of the light-receiving lenses 11 may penetrate a substantially center portion in the main scanning direction (X direction) of each of the light-receiving element arrays 120 in a one-to-one correspondence. In this system, a plurality of the light-receiving element arrays 120 are arranged in a plurality of rows in the sub-scanning direction (Y direction). That is, the light-receiving element arrays 120 in a plurality of rows are arranged in a manner separated from each other in a direction (Y direction) perpendicular to the arrangement direction (X direction) of the light-receiving element.

Figure 6B:
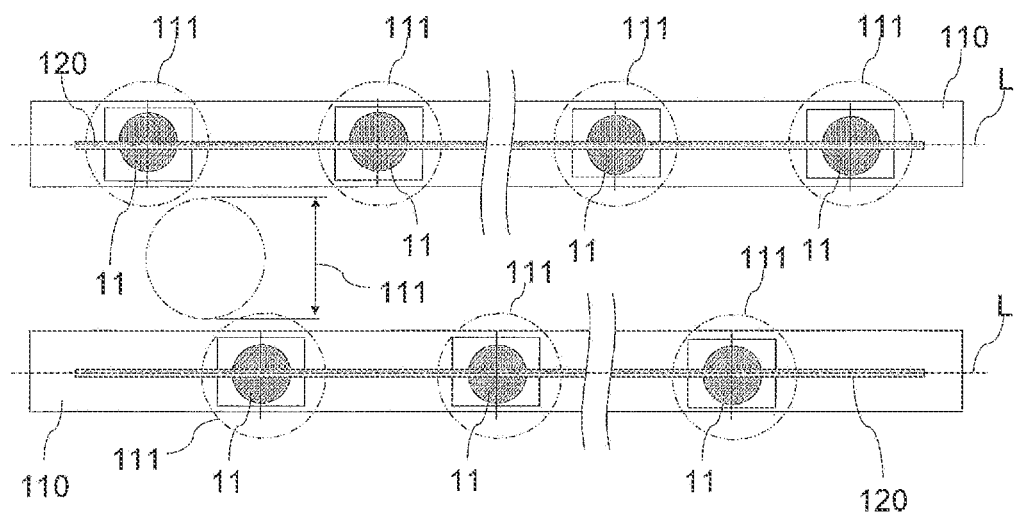
FIG. 6B is a schematic diagram illustrating still another example of the light-receiving system in which a plurality of light-receiving element arrays is arranged.

FIG. 6B is a schematic diagram illustrating still another example of the light-receiving system in which a plurality of the light-receiving element arrays 120 are arranged. In FIG. 6B, the light-receiving element arrays 120 including a long sensor (length corresponding to the entire length in the main scanning direction) are arranged as line sensors having the same length while being separated from each other by the visual field 111 of the light-receiving lens 11 or more in the sub-scanning direction (Y direction). As illustrated in FIG. 6B, one of the light-receiving element arrays 120 may correspond to a plurality of the light-receiving lenses 11 arranged in the main scanning direction (X direction), so that a plurality of the light-receiving element arrays 120 may be arranged as many as the number of rows of the light-receiving lenses 11 in the sub-scanning direction (Y direction).

In both of FIGS. 6A and 6B, each of a plurality of the light-receiving element arrays 120 are arranged to be separated from each other by a visual field dimension of the light-receiving lens 11 or more in the sub-scanning direction (Y direction) orthogonal to the reading line L. However, the present invention is not limited to such a configuration, and a plurality of the light-receiving element arrays 120 may be separated from each other by a diameter of the light-receiving lens 11 or more in the sub-scanning direction (Y direction) orthogonal to the reading line L, and may be separated from each other by a visual field dimension of the light-receiving lens 11 or less. As described above, the short light-receiving element arrays 120 may be used in staggered arrangement (see FIG. 6A), or two rows of the light-receiving element arrays 120 may be arranged to be separated from each other (see FIG. 6B). However, the present invention is not limited to this configuration, and a larger number of the light-receiving element arrays 120 may be arranged to be separated from each other in the sub-scanning direction (Y direction).

Figure 6C:
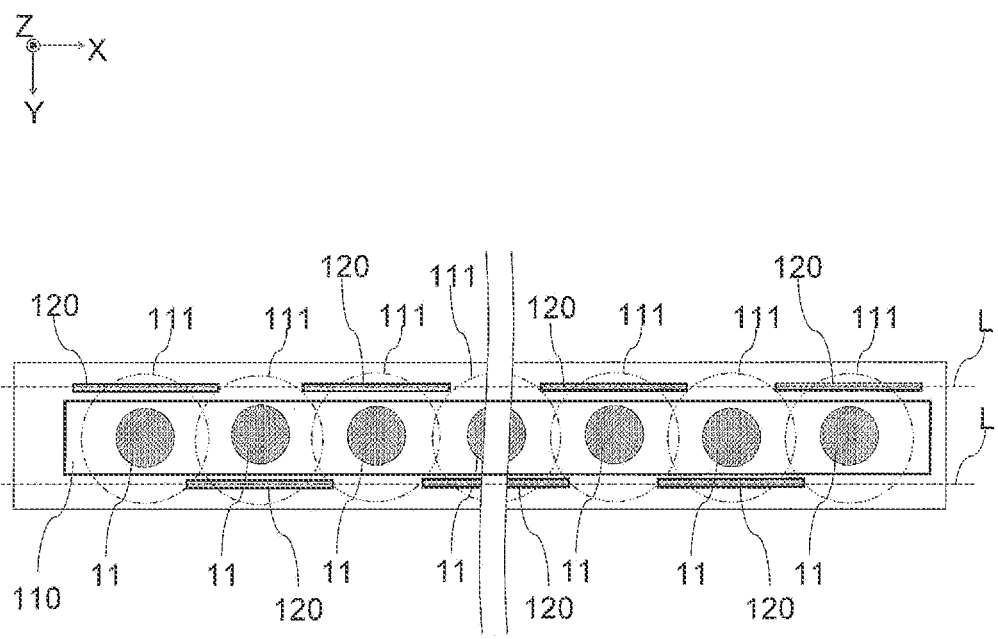
FIG. 6C is a schematic diagram of the light-receiving system in a case where one row of light-receiving lenses are arranged between two rows of light-receiving element arrays arranged in a staggered manner.

Furthermore, FIG. 6C illustrates a case where one row of the light-receiving lenses 11 are arranged in parallel to the light-receiving element array 120 at a substantially center portion in the sub-scanning direction (Y direction) of two rows of the light-receiving element arrays 120 arranged in a staggered manner. In FIG. 6C, in the light-receiving element array 120 in staggered arrangement the common light-receiving lens 11 are arranged in the sub-scanning direction (Y direction). In FIG. 6C, a plurality of the light-receiving element arrays 120 arranged in two rows of the reading lines L are shorter than the reading line L and are separated from each other in the main scanning direction (X direction). Further, the light-receiving element array 120 arranged in one of the reading lines L and the light-receiving element array 120 arranged in the other one of the reading lines L are alternately arranged in a staggered manner along the main scanning direction (X direction). Between two rows of the reading lines L, a plurality of the light-receiving lenses 11 are arranged in one row in parallel to a plurality of the light-receiving element arrays 120, and an optical axis of each of the light-receiving lenses 11 penetrates substantially a center portion in the sub-scanning direction (Y direction) of two rows of the reading lines L. In this case, even if the light-receiving lenses 11 are in one row, light transmitted through each of the light-receiving lenses 11 can be received by two rows of the light-receiving element arrays 120.

3. Lengthening Focus of Light-Receiving Lens

Next, lengthening of a focus of a light-receiving lens will be described. In a conventional SELFOC lens, emphasis is placed on compactness and cost reduction of a CIS, and a lens having a shorter conjugate length has been required. However, this tendency is a factor that encourages reduction in an allowable depth of field. Moreover, a lens diameter is becoming smaller and smaller. In a case where a focus of a light-receiving lens is lengthened, when a conventional light-receiving lens is used. N.A. becomes extremely small. Therefore, the influence of diffraction increases, and blurring due to a diffraction limit becomes a dominant factor of optical resolution degradation rather than blurring due to geometric optical aberration of the light-receiving lens itself. Since a CIS of a conventional system has large N.A., occurrence of image blurring due to a diffraction limit has been ignorable. However, in order to have large W.D., it is necessary to extend a focal length of a light-receiving lens, that is, N.A. is reduced. For this reason, in a conventional lens diameter, as a focal length increases, influence of diffraction increases accordingly. The present embodiment proposes a method in which a lens diameter is increased so that W.D. is increased, and optical resolution is not degraded even in a case where image blur due to a diffraction limit is reduced.

An Abbe's diffraction limit d is inversely proportional to numerical aperture N.A. Since an optical system is in the air, Equation 1 below is established using a wavelength λ in the air.

$$d=\lambda/N.A. \qquad \text{(Equation 1)}$$

Figure 7:
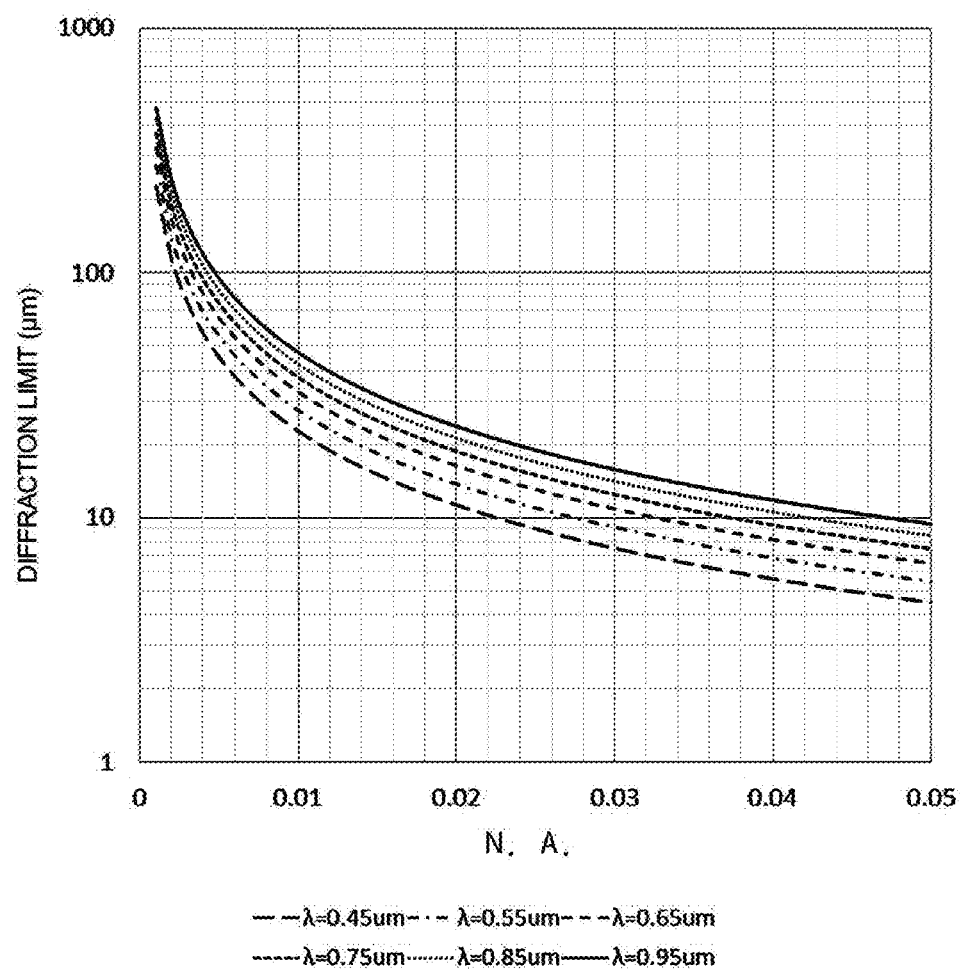
FIG. 7 is a graph showing a relationship between N.A. and a diffraction limit for each wavelength.

FIG. 7 shows a relationship between N.A. and a diffraction limit for each wavelength. In the light-receiving lens 11 having the same lens parameter, if what is called a pitch of the light-receiving lens 11 itself is shortened, a focal length increases, and influence of aberration also decreases.

The above shows that it is necessary to further increase a lens diameter in order to lengthen a focal length of the light-receiving lens 11. By maintaining same N.A., influence of diffraction can be made equal to that of the light-receiving lens 11 having short focus. However, when a lens diameter is increased, geometrical optical aberration increases. In view of the above, in the light-receiving lens 11 having different lens parameters, it is necessary to examine a diameter of the least circle of confusion in a case where a lens diameter is increased. The wavelength λ is set to λ=630 nm having a large diffraction limit diameter.

Figure 8A:
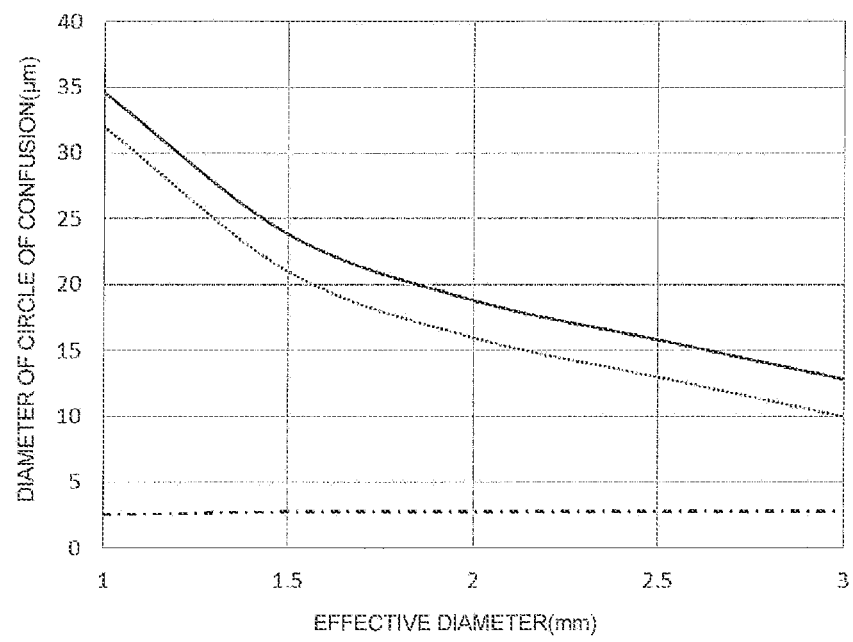
FIG. 8A is a graph showing a relationship between an effective diameter of a SELFOC® lens A and a diameter of a circle of confusion.
Figure 8B:
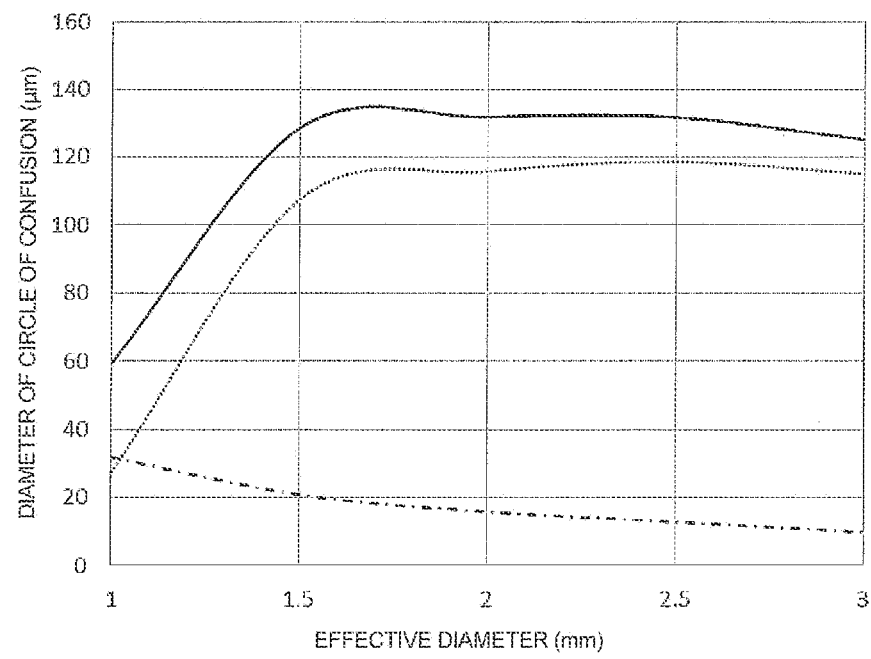
FIG. 8B is a graph showing a relationship between an effective diameter of a SELFOC® lens B and a diameter of a circle of confusion.
Figure 8C:
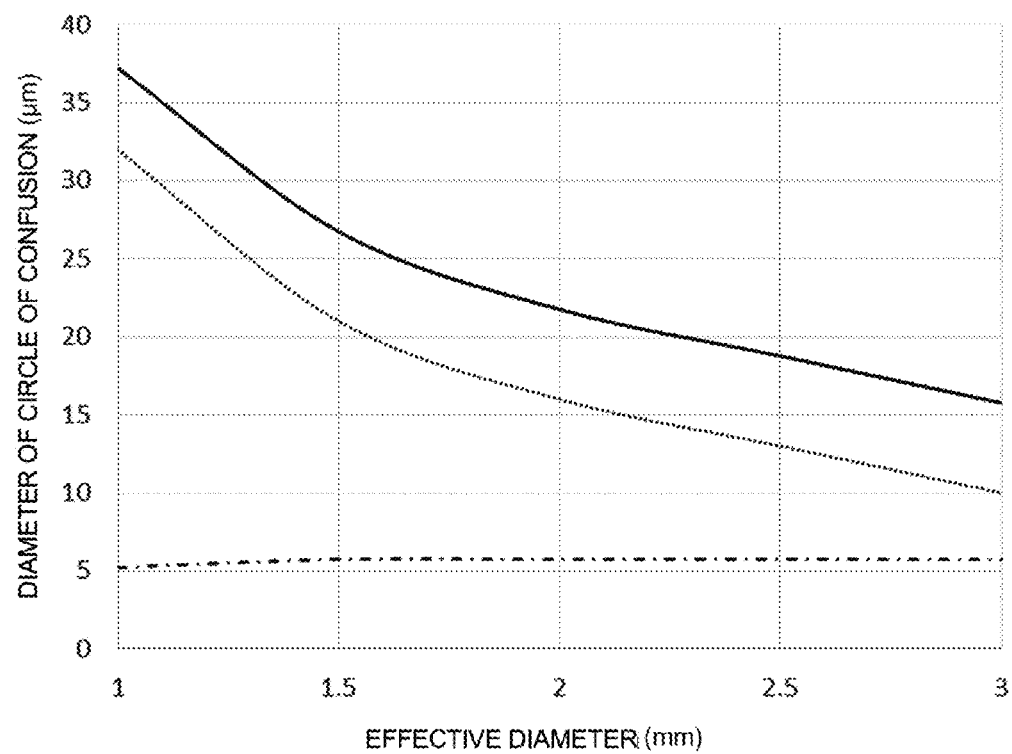
FIG. 8C is a graph showing a relationship between an effective diameter of a SELFOC® lens C and a diameter of a circle of confusion.

As a result of examination by the inventor of the present application, it has been found that a relationship of a least circle of confusion with respect to each focal length of a certain one of the light-receiving lenses 11 is preferably considered. For example, FIGS. 8A to 8C illustrate a case where a focal length f is f=50 mm. Here, in a case where three types of SELFOC® lenses (SELFOC® lens A, SELFOC® lens B, and SELFOC®, lens C) are used as the light-receiving lens 11, FIG. 8A illustrates a relationship between an effective diameter of the SELFOC® lens A and a diameter of a circle of confusion, FIG. 8B illustrates a relationship between an effective diameter of the SELFOC® lens B and a diameter of a circle of confusion, and FIG. 8C illustrates a relationship between an effective diameter of the SELFOC® lens C and a diameter of a circle of confusion. In FIGS. 8A to 8C, a solid line indicates a total circle of confusion, a broken line indicates a circle of confusion due to diffraction, and an alternate long and short dash line indicates a geometric optical circle of confusion.

According to FIGS. 7 and 8A, a relationship between a least circle of confusion and a diffraction limit, that is, optical resolution at a certain lens diameter and a focal length can be seen. Therefore, in the case of the light-receiving lens 11 illustrated in FIG. 8A, as an effective diameter Φ increases, a diameter of a circle of confusion decreases, and the effective diameter Φ is shown to be preferably 1.0 mm≤Φ≤3.0 mm.

On the other hand, according to FIGS. 7 and 8B, since a geometric optical circle of confusion is large and degree of dependency due to diffraction is reduced, a diameter of a circle of confusion when Φ=1.0 mm is smallest. Furthermore, even when Φ=1.0 mm, a diameter of a circle of confusion is close to twice that of the light-receiving lens 11 illustrated in FIG. 8A. The light-receiving lens 11 illustrated in FIG. 8A is a SELFOC® lens having smaller aberration and a larger effective diameter than the light-receiving lens 11 illustrated in FIG. 8B, and it can be seen that the light-receiving lens 11 in FIG. 8A should be selected. Furthermore, in the light-receiving lens 11 in FIG. 8A having the same focal length, N.A. can beat least three times larger than that of the light-receiving lens 11 in FIG. 8B, that is, an amount of received light becomes nine times or more, and thus output of a light-receiving element also becomes nine times or more. Accordingly, shot noise depending on an amount of light received by alight-receiving element is also reduced to ⅓, so that the light-receiving lens 11 illustrated in FIG. 8A is preferable also from the viewpoint of noise reduction. Further, in a case where the same amount of noise is allowed, a scanning speed of the light-receiving lens 11 in FIG. 8A can be considered to be improved by nine times as compared with the light-receiving lens 11 in FIG. 8B.

According to FIG. 8C, similarly to the SELFOC® lens A, the SELFOC® lens C has less aberration and can have a large effective diameter.

Next, a parameter of the SELFOC® lenses A to C illustrated in FIGS. 8A to 8C is illustrated in Table 1 below. The most important parameter in Table 1 is a refractive index distribution constant. The light-receiving lens 11 having low aberration when an effective diameter is increased and a focal length is extended is the SELFOC lens A having the smallest refractive index distribution constant, and the light-receiving lens 11 having next lower aberration is the SELFOC® lens C. Needless to say, the light-receiving lens 11 having a large effective diameter, being bright, and having less aberration is preferable in order to achieve high resolution and highspeed inspection.

TABLE 1

| | Focal length (mm) | On-axis refractive index | Refractive index distribution constant (1/mm) |
|---|---|---|---|
| SELFOC ® lens A | 50 | 1.615 | 0.077 |
| SELFOC ® lens B | | | 0.154 |
| SELFOC ® lens C | | | 0.103 |

Figure 9A:
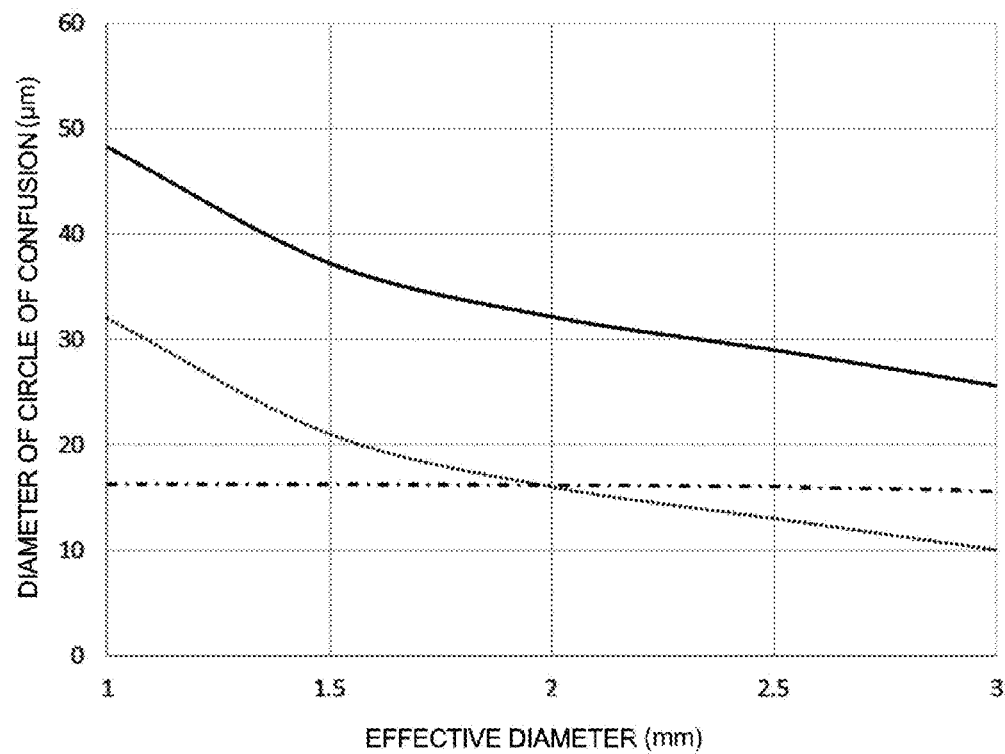
FIG. 9A is a graph showing a relationship between an effective diameter of a rod lens A and a diameter of a circle of confusion.
Figure 9B:
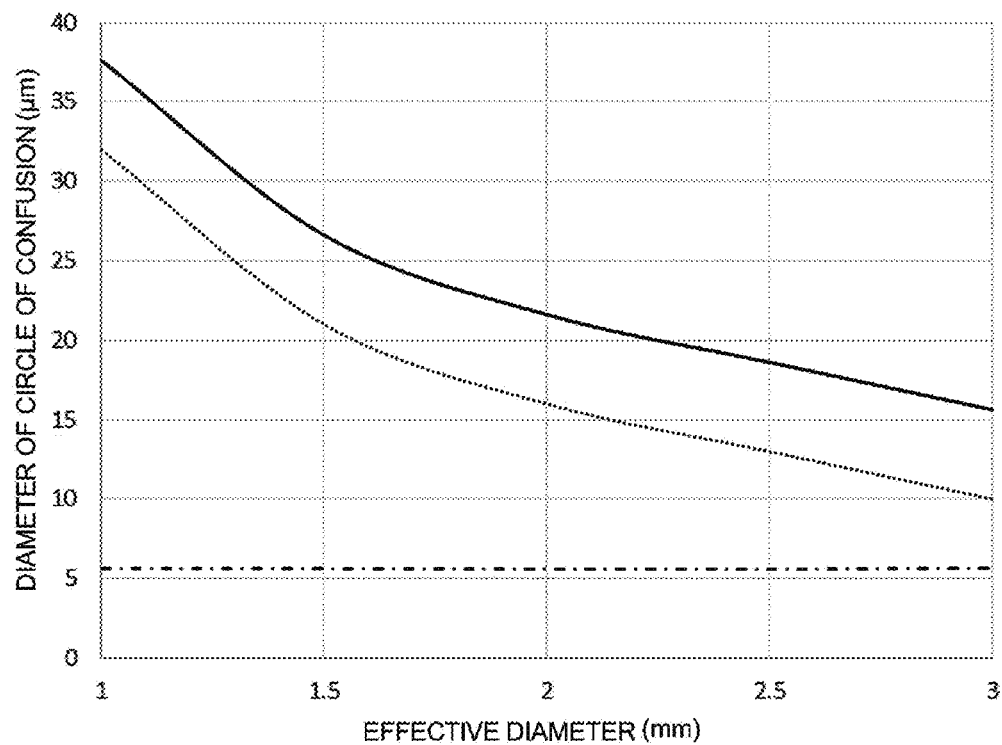
FIG. 9B is a graph showing a relationship between an effective diameter of a rod lens B and a diameter of a circle of confusion.
Figure 9C:
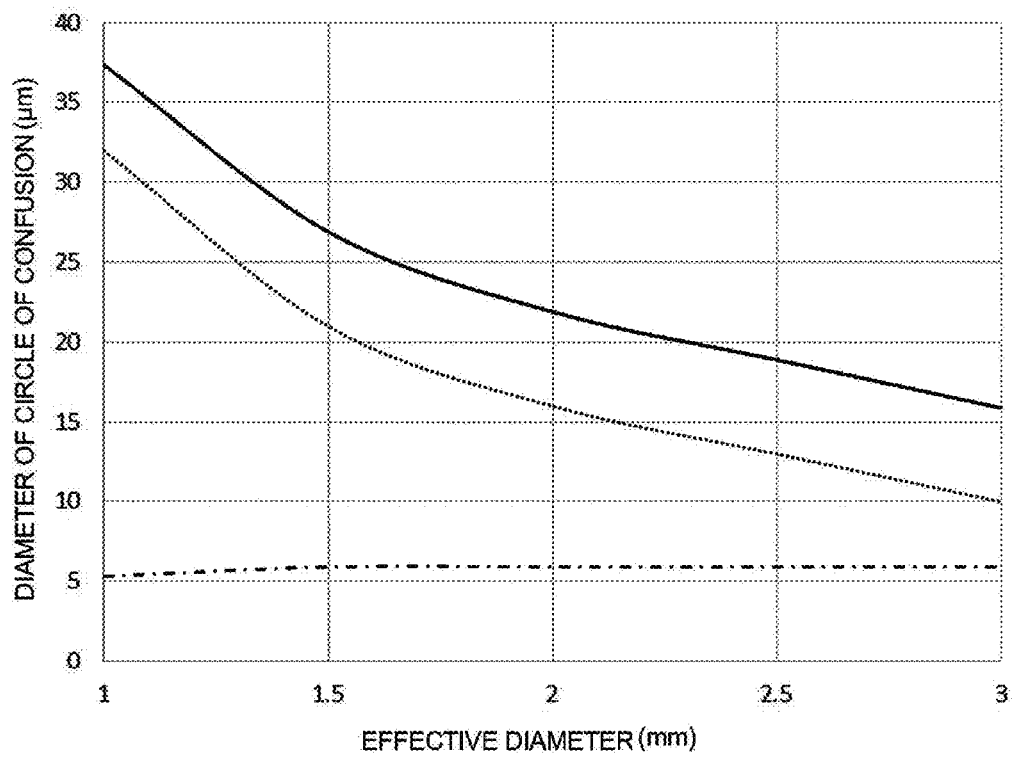
FIG. 9C is a graph showing a relationship between an effective diameter of a rod lens C and a diameter of a circle of confusion.
Figure 9D:
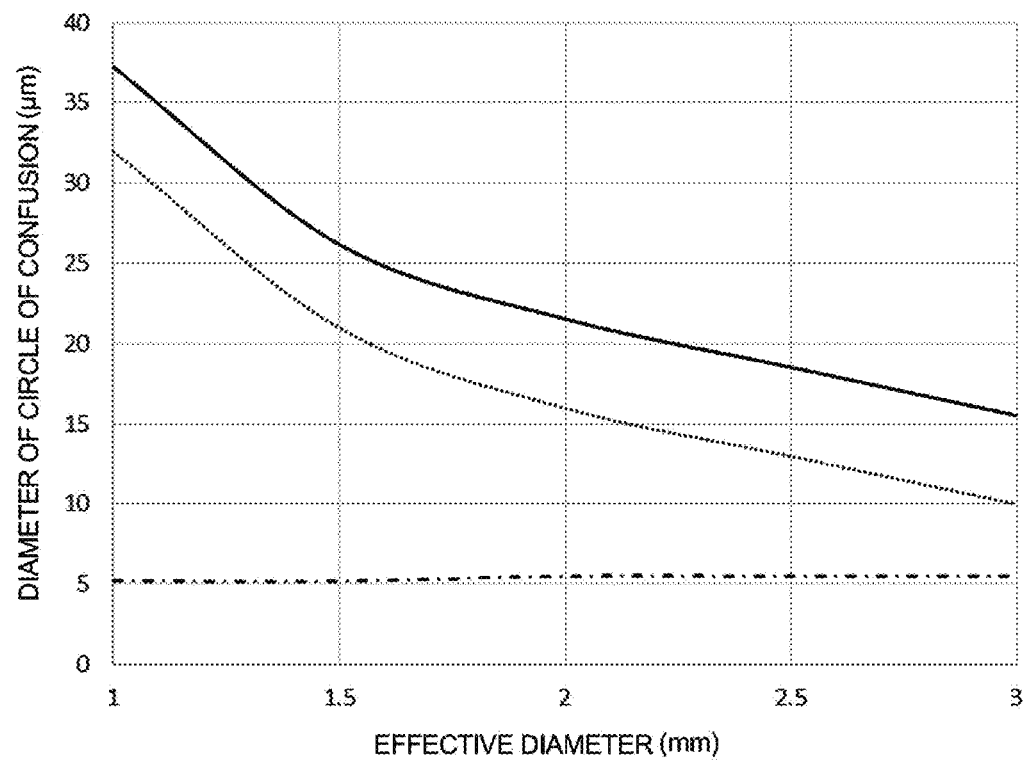
FIG. 9D is a graph showing a relationship between an effective diameter of a rod lens D and a diameter of a circle of confusion.

Furthermore, in a case where four types of plastic rod lenses (plastic refractive index distribution type lenses) are used as the light-receiving lens 11. FIG. 9A illustrates a relationship between an effective diameter of a rod lens A and a diameter of a circle of confusion. FIG. 9B illustrates a relationship between an effective diameter of a rod lens B and a diameter of a circle of confusion, FIG. 9C illustrates a relationship between an effective diameter of a rod lens C and a diameter of a circle of confusion, and FIG. 9D illustrates a relationship between an effective diameter of a rod lens D and a diameter of a circle of confusion. In FIGS. 9A to 9D, a solid line indicates a total circle of confusion, a broken line indicates a circle of confusion due to diffraction, and an alternate long and short dash line indicates a geometric optical circle of confusion. Further, a parameter of the rod lenses A to D illustrated in FIGS. 9A to 9D is illustrated in Table 2 below. It can be seen that the plastic rod lens also has the same tendency as the SELFOC lens. Considering a refractive index of a plastic rod lens and a refractive index of a glass lens, an on-axis refractive index is preferably about 1.45 to 1.65.

TABLE 2

| | Focal length (mm) | On-axis refractive index | Refractive index distribution constant (1/mm) |
|---|---|---|---|
| Rod lens A | 50 | 1.491 | 0.28 |
| Rod lens B | | | 0.14 |
| Rod lens C | | | 0.105 |
| Rod lens D | | | 0.07 |

The above shows that a refractive index distribution constant is a dominant factor of aberration. In an ideal refractive index distribution type lens, aberration is lowered as a refractive index gradually changes. This is similar to a case where even in a normal spherical lens, a sudden angle change is a cause of occurrence of aberration. A sudden angle change means an increase in a high-order nonlinear effect when Snell' Law is subjected to polynomial expansion. That is, since deviation from paraxial optics becomes large, aberration becomes large. The inventor of the present application has found that a refractive index distribution constant is preferably 0.12 or less in order to achieve pixel resolution with a resolution of 400 dpi or more when a focal length or W.D. is approximately 50 mm or more and the effective diameter $\Phi$ is approximately $\Phi \geq 1.0$ mm.

4. Variation of Light-Receiving Lens

Figure 10:
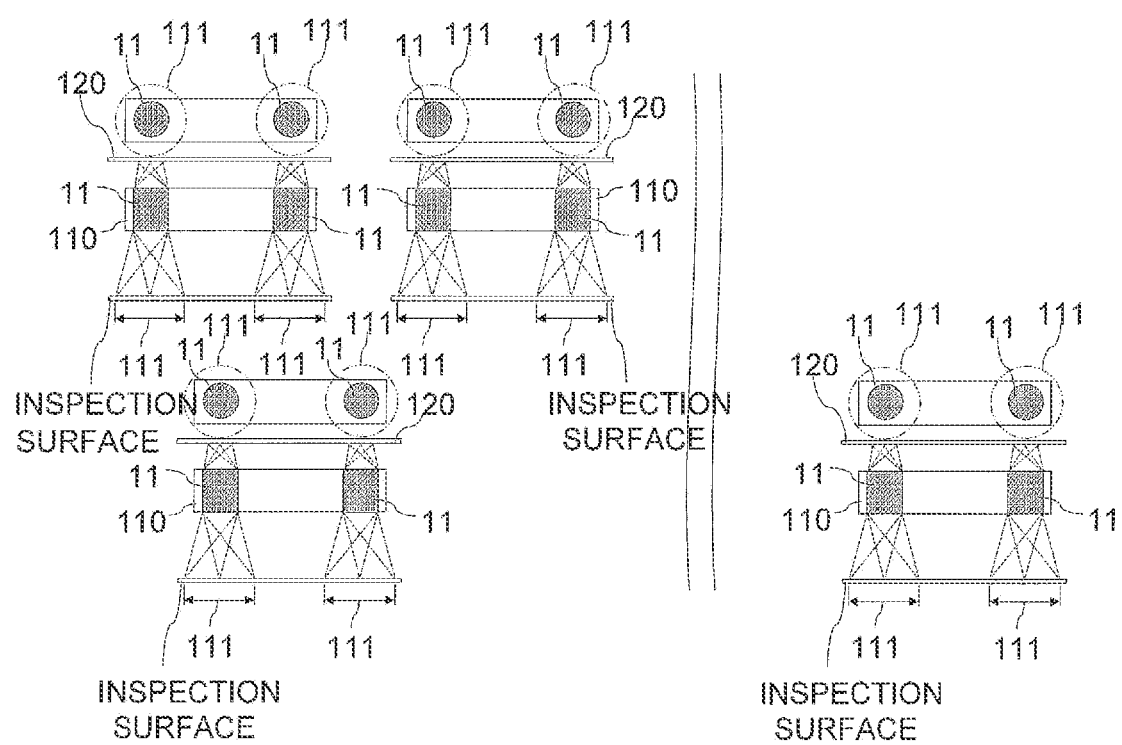
FIG. 10 is a schematic diagram in a case where light-receiving lenses are separated by a visual field dimension of the light-receiving lenses or more, and light-receiving element arrays are arranged to be separated by a visual field dimension of the light-receiving lenses or more in a direction orthogonal to a reading line.

Next, a method of further increasing a depth of field will be described. FIG. 10 is a schematic diagram in a case where the receiver lens 11 is an upright reducing multi-eye lens instead of an upright equal magnification multi-eye lens. FIG. 10 illustrates a schematic diagram in a case where light-receiving lenses 11 are separated by a visual field dimension of the light-receiving lenses 11 or more, and the light-receiving element arrays 120 are arranged to be separated by a visual field dimension of the light-receiving lenses 11 or more in a direction orthogonal to the reading line L. In FIG. 10, a part of a light-receiving system is illustrated in a plan view, but a side view of the part of the light-receiving system is also illustrated for visual clarity.

In this case, a depth of field can be increased significantly as compared with the upright equal magnification lens described above. For example, when lateral magnification is set to four times, a depth of field is increased by two times. In a case where lateral magnification is nine times, a depth of field is three times as large. In this case, pixel dimension of alight-receiving element is also made smaller than pixel dimension in an equal magnification system according to reduction magnification and according to desired resolution. However, the same pixel dimension as that of an equal magnification system may be used depending on resolution.

Figure 11:
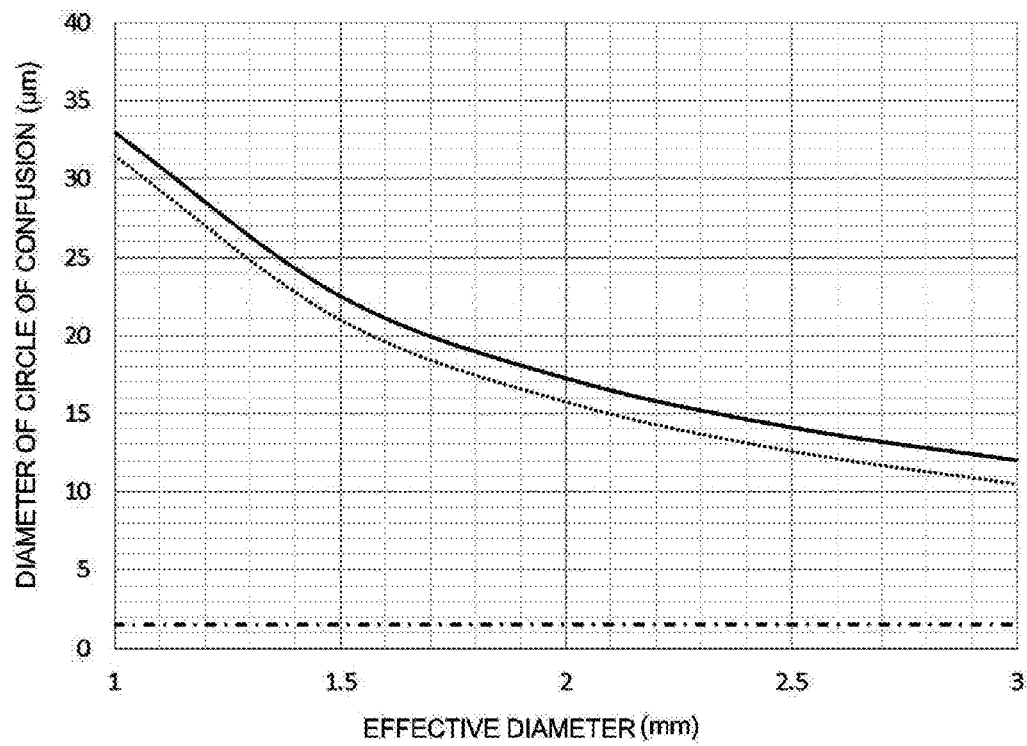
FIG. 11 is a graph showing a relationship between an effective diameter of a reduction lens and a shape of a circle of confusion.

FIG. 11 illustrates a relationship between an effective diameter of a reduction lens and a diameter of a circle of confusion. Reduction magnification of a reduction lens is 1:4. Further, a wavelength is $\Delta=630$ nm. Comparing FIG. 8A with FIG. 11, a circle of confusion of the reduction lens is smaller than that of an equal magnification system, and a circle of confusion of an equal magnification system is about 40 μm between the lens diameter $\Phi=2$ mm to $\Phi=2.5$ mm, while that in a reduction system is 14 μm to 18 μm, which is half or less. Therefore, it can be seen that a depth of field and resolution can be improved.

Furthermore, the light-receiving lens 11 in the invention of the present application is not limited to a refractive index distribution type lens such as a SELFOC® lens or a plastic rod lens, and in other lenses, for example, an achromatic lens, an apochromatic lens, and the like, in consideration of cost, it is also possible to use a lens in which aberration due to a non-linear effect in the refractive index distribution type lens is equalized, that is, spherical aberration, coma aberration, and astigmatism are equalized, or a telecentric refractive optical system in the same arrangement and dimension (aperture) instead of a refractive index distribution type lens such as a SELFOC® lens or a plastic rod lens in which aberrations due to a non-linear effect in the refractive index distribution type lens and a diffraction limit are equivalent. The same applies to the light-receiving lens 11 that forms an inverted image to be described later.

The above-described optical system is of a case where an upright lens is used at the center but may be an inverted optical system in a case where the visual fields 111 do not overlap. That is, a plurality of the light-receiving lenses 11 may be configured to form an inverted image. As long as a lens array is of a two-row system, an inverted optical system can be employed. In a case of an inverted optical system, since an image is inverted and symmetric about an optical axis, an inverted image is preferably converted into an erected image by image processing at the time of image synthesis. That is, an inverted image of a plurality of the light-receiving lenses 11 is preferably inverted and converted into an erected image, and then image synthesis processing is preferably performed. Further, in a process of the operation, necessity or unnecessity of an overlapping portion is preferably determined and corrected by a correction algorithm, and conversion into an erect image is preferably performed based on a determined relationship between the pixels. Alternatively, in inspection in a case where an image is not constructed, it is only necessary to detect a flaw or a defect, and thus, it is not necessary to perform image synthesis and image processing and detected portions on an inspection surface may be superimposed. In the case of superimposition, correction of a position by a correction chart is performed in advance.

Furthermore, in a case of an inverted refractive optical system, in signal processing for each light-receiving element, for example, data obtained from one of two rows of light-receiving element arrays arranged in a staggered manner so as to be separated in the sub-scanning direction may be acquired longer, data obtained from the other light-receiving element array may be acquired shorter, inversion operation to an erected image may be performed for an acquired image, and then image synthesis may be performed. Alternatively, after inverted image data of each light-receiving element is converted into an erected image, a correction coefficient may be multiplied by or subtracted from portions that overlap at the time of image synthesis.

Specifically, in an inverted refractive optical system, a plurality of light-receiving element arrays may be light-receiving element arrays shorter than a plurality of reading lines arranged in two rows of reading lines. Further, a light-receiving element arrays arranged in one of reading lines and a light-receiving element arrays arranged in the other one of the reading lines may be alternately arranged in a staggered manner along the main scanning direction. Such a configuration is similar to the case of the upright refractive optical system described in FIG. 6A, and thus a detailed description of the configuration will be omitted.

In this case, as illustrated in FIG. 6A, a plurality of light-receiving elements are arranged in arrays of two or more rows to constitute a plurality of the light-receiving element arrays 120. Further, each of a plurality of the light-receiving element arrays 120 is arranged to be separated from each other by a visual field dimension or more of the light-receiving lens 11 in a direction orthogonal to the reading line L. A plurality of the light-receiving lenses 11 are arranged as many as a plurality of the light-receiving element arrays 120, and an optical axis of each of the light-receiving lenses 11 passes through a substantially center portion of each of the light-receiving element arrays 120.

5. Configuration of Illumination Optical System

In the present embodiment, the focal length f of the light-receiving lens 11 is f=50 mm, N.A. is N.A.=0.01, 0.02, 0.025, and 0.03, and a refractive index distribution constant $\sqrt{A}$ is $\sqrt{A}$=0.077. Regarding the light source 103, since W.D. is longer than a conventional CIS by ten times or more, in an equal magnification system, inspection surface illuminance needs to be 100 times or more. For this reason, for example, a high-luminance white LED array is used as the light source 103. That is, a plurality of the light sources 103 may be configured to include a white LED. In a case where a semiconductor laser in a visible range is used as the light source 103, an emitted beam is enlarged in the main scanning direction and collimated in the sub-scanning direction to reduce light amount unevenness at the time of irradiation.

Figure 12A:
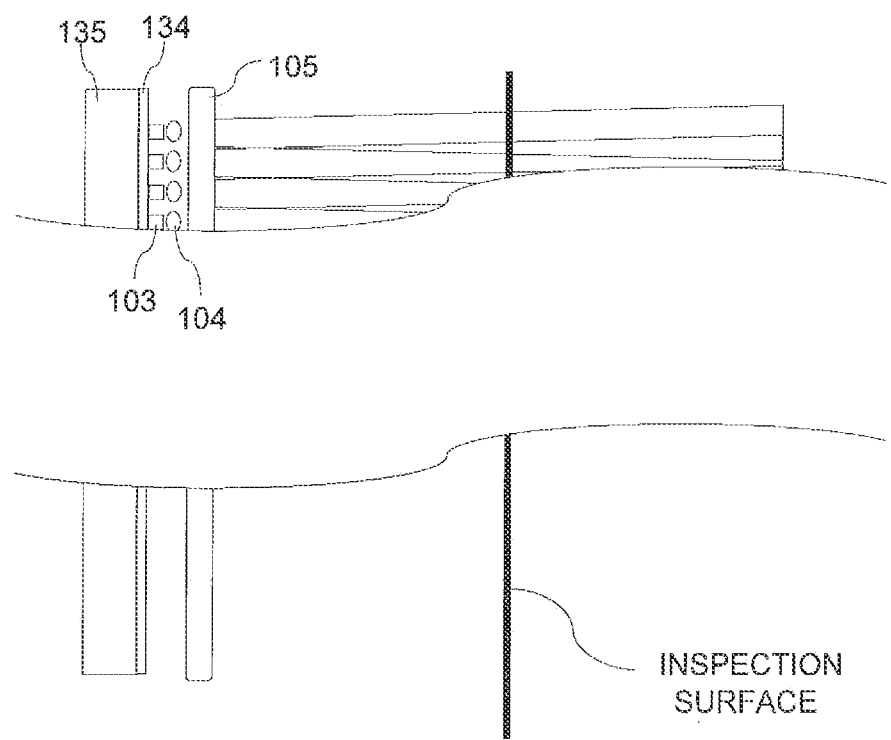
FIG. 12A is a schematic diagram illustrating one example of an arrangement method in a case where an RGB-LED or an RGB-LD (laser diode; semiconductor laser) is used as a light source.

FIG. 12A illustrates one example of an arrangement method in a case where an RGB-LED or an RGB-LD (laser diode, semiconductor laser) is used as the light source 103. As described above, a plurality of the light sources 103 may be configured to include a red LED (R), a green LED (G), and a blue LED (B) or may be configured to include a laser diode. In FIG. 12A, a plurality of the light sources 103 are mounted on a light source substrate 134, and a heat sink 135 is attached to the light source substrate 134. A beam emitted from each of the light sources 103 is collimated by a condenser lens 104 having an ellipsoidal shape in which lens power is different between the main scanning direction and the sub-scanning direction and is applied to an inspection object. Here, the condenser lens 104 having an ellipsoidal shape is described, but any lens may be used as long as lens power is appropriately different between the main scanning direction and the sub-scanning direction. Here, power of a lens is a reciprocal of a focal length and is a measure representing refractive power of a lens.

Figure 12B:
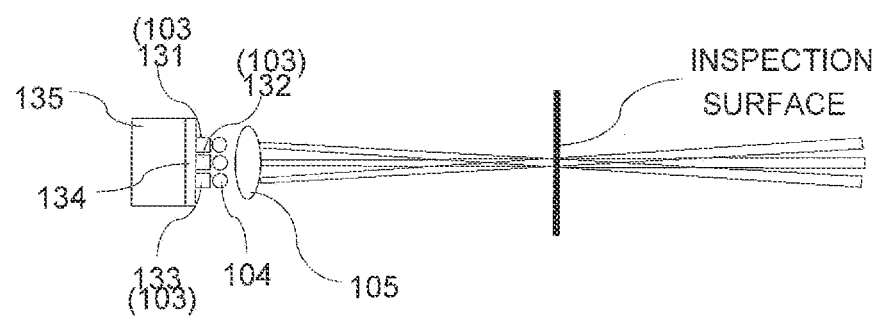
FIG. 12B is a side view illustrating a specific example of an arrangement method in a case where an LD is used as a light source.

Alternatively, the LD may be a nom-al collimator lens as long as an end surface emission type LD in which a spread angle of an emission beam of the LD itself is different between the horizontal direction and the vertical direction is used. FIG. 12B is a side view illustrating a specific example of an arrangement method in a case where an LD is used as the light source 103. In this case, an LD having a larger spread angle is arranged in parallel to the main scanning direction. Beams emitted from a red LD 131, a green LD 132, and a blue LD 133 constituting the light source 103 are collimated by the condenser lens 104 associated with each of them, and then, are focused on an inspection surface by a cylindrical lens 105. In this way, each color of RGB is emitted to substantially the same position in the sub-scanning direction, and color unevenness with respect to the sub-scanning direction can be reduced. On the other hand, light emitted by the light source 103 such as an LED or an LD and diffused and reflected by an inspection surface forms an image on a light-receiving element array by a light-receiving lens system. As a light-receiving element, in an equal magnification optical system, one having an element size of 62 μm corresponding to 400 dpi to an element size of 42 μm corresponding to 600 dpi is used. In a case where an element size of 600 dpi or more is used, power of illumination light is preferably increased accordingly. As described above, a plurality of the light sources 103 may include the light sources 131 to 133 having a plurality of different wavelengths, and a plurality of the light sources 103 in one unit may be configured to be arranged in the main scanning direction (X direction) with the light sources 131 to 133 as one unit.

Furthermore, even if radiance per unit area is the same, if size of a light-receiving element is different, it is synonymous with that areas of the light emitting units are different, and thus an amount of received light decreases in inverse proportion to substantially the square of an area of a light-receiving element. An illumination light amount is determined in consideration of the above. When an element size decreases, an amount of received light decreases in inverse proportion to an element area in the same accumulation time. This is a physical property of a semiconductor light-receiving element, and in order to maintain S/N, an amount of illumination light is preferably increased to increase power density, and the number of generated electrons generated per unit time is preferably made the same. By the above, even if size of a light-receiving element decreases, shot noise can be maintained at the same level as a light-receiving element having a large size. Further, light received by a light-receiving element depends not only on illuminance of an inspection surface but also on a range viewed by a light-receiving element when light is received. Needless to say, if a solid angle of light reception is different and the angle decreases, an amount of received light also decreases, and if an inspection surface is a perfect diffusion surface, an amount of received light is in accordance with what is called the cos law. Light that is diffused and reflected from an inspection surface is captured by a light-receiving lens and condensed on a light-receiving element, and an output signal of the light is output from the light-receiving element. Further, an output signal from a light-receiving element array is branched from serial to parallel so that processing speed is improved and is transmitted to an image processing device.

Figure 13A:
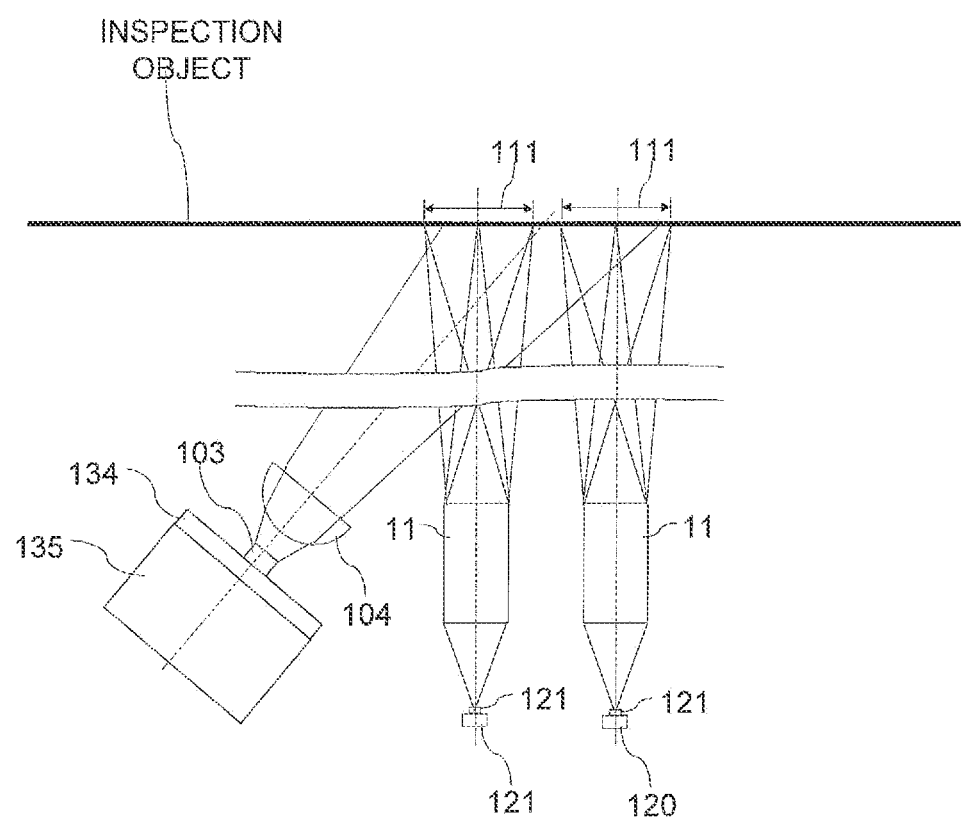
FIG. 13A is a side view illustrating an example of a positional relationship between a light source and a light-receiving system.
Figure 13B:
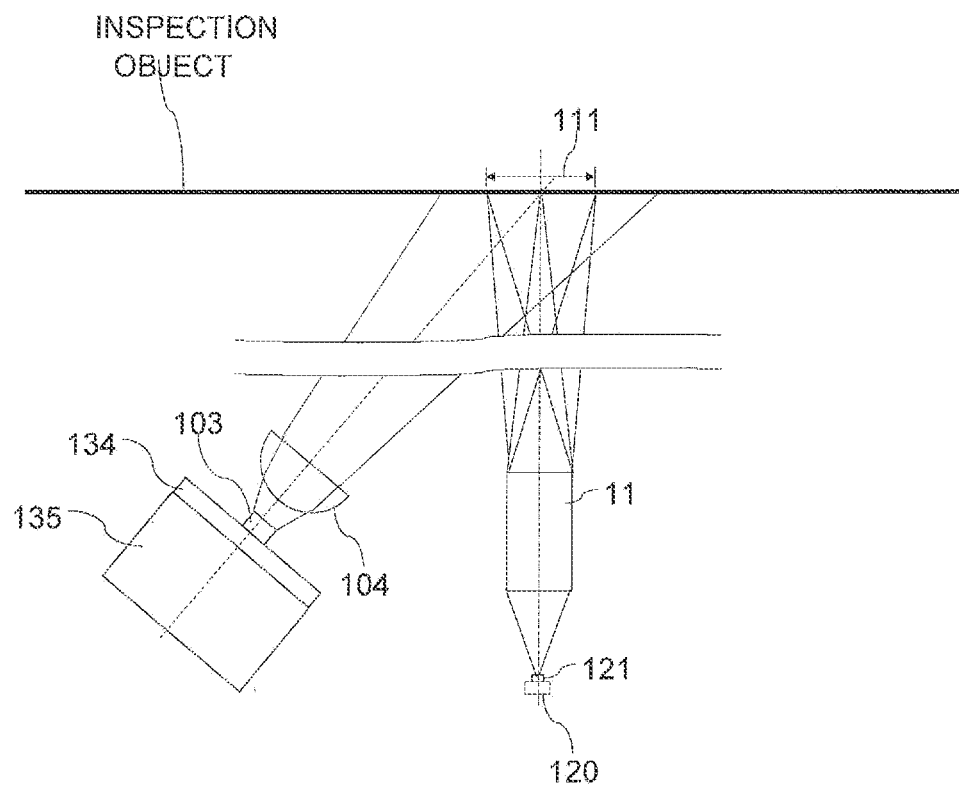
FIG. 13B is a side view illustrating another example of the positional relationship between the light source and the light-receiving system.

In the present embodiment, a light-receiving lens system is arranged to be separated by about a visual field dimension. For this reason, light amount unevenness due to vignetting of a lens is likely to occur. For this reason, contrivance needs to be made on light source arrangement FIGS. 13A and 13B illustrate a positional relationship between the light source 103 and alight-receiving system FIG. 13A is a schematic diagram illustrating an example of a positional relationship between the light source 103 and alight-receiving system, and illustrates a case where two rows of the light-receiving element arrays 120 are arranged in a staggered manner in a short sensor or as line sensors having the same length in a long sensor (length corresponding to the entire length in the main scanning direction) in a manner separated by a distance larger than the visual field 111 of the light-receiving lens 11. Further, FIG. 13B is a schematic diagram illustrating another example of a positional relationship between the light source 103 and a light-receiving system and illustrates that the light-receiving lens 11 is arranged in the main scanning direction such that the visual fields 111 of the light-receiving lens 11 do not substantially overlap.

Figure 14A:
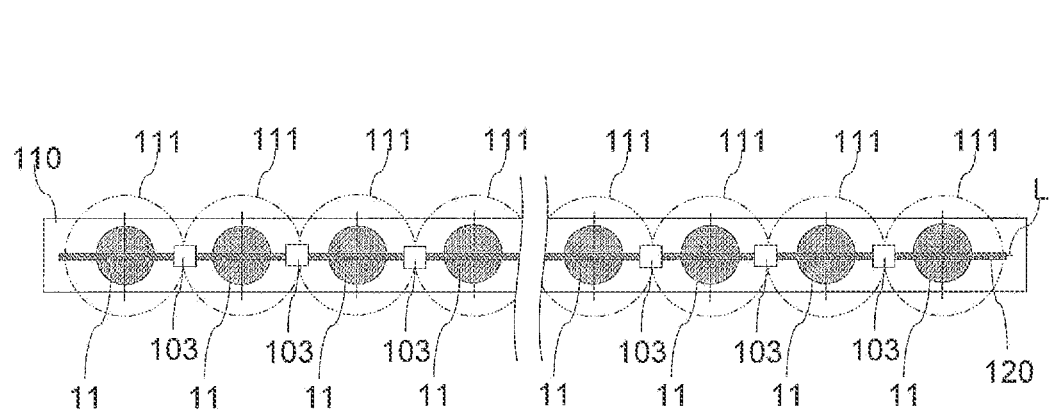
FIG. 14A is a schematic diagram illustrating a positional relationship between alight source and alight-receiving lens and illustrates a case of one row of light-receiving element arrays.

FIG. 14A is a schematic diagram illustrating a positional relationship between the light source 103 and the light-receiving lens 11 and illustrates a case of one row of the light-receiving element arrays 120. In the embodiment of FIG. 14A, a position of the light source 103 is determined such that a minimum value of unevenness on an inspection surface of illumination light of the light source 103 is located in a substantially center portion of the light-receiving element array 120. Generally, the light source 103 is determined at a position on a virtual plane perpendicular to the main scanning direction including a substantially center portion between the light-receiving lenses 11 adjacent to each other in the main scanning direction (X direction) in consideration of absolute irradiance on an inspection surface. The light sources 103 are arranged in parallel to the reading line L. Further, an optical axis of each of the light sources 103 is arranged at an optional position on a virtual plane which forms an intersection with an optical axis of each of the light-receiving lenses 11 and intersects an optical axis of each of the light-receiving lenses 11. In FIG. 14A, the light source 103 is arranged at a substantially center portion between the light-receiving lenses 11 adjacent to each other. In the present embodiment, the focal length f of the light-receiving lens 11 is f=50 mm, and the lens diameter $\Phi$ is $\Phi$=4 mm (however, in consideration of geometric optical aberration, an effective diameter $\Phi'$ is set to $\Phi'$=2.5 mm using an aperture), and thus, the light sources 103 are arranged at intervals of approximately 4 mm in the main scanning direction (X direction). In the present embodiment, light is emitted from the light source 103 at an angle of about 45 degrees with respect to an inspection surface. For this reason, a distance between the light source 103 and an inspection surface is set to 70 mm in consideration of W.D. of the light-receiving lens 11. In the present embodiment, an LD is used, bit an LED of each wavelength may be used.

Figure 14B:
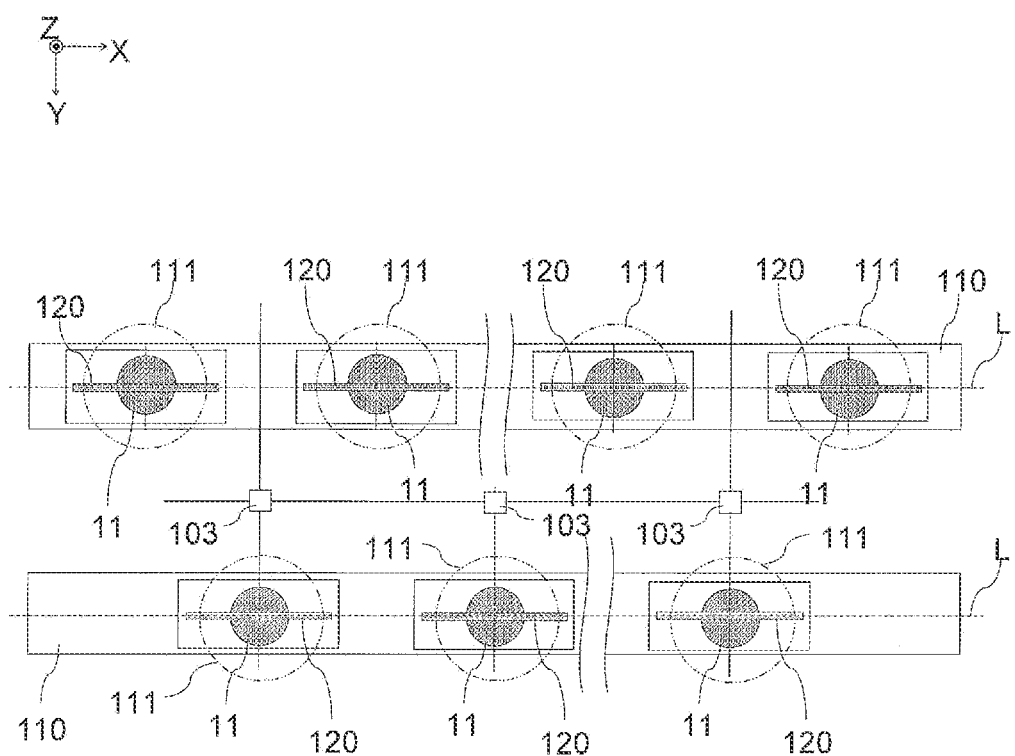
FIG. 14B is a schematic diagram illustrating the positional relationship between the light source and the light-receiving lens and illustrates a case of two rows of the light-receiving element arrays.

FIG. 14B is a schematic diagram illustrating a positional relationship between the light source 103 and the light-receiving lens 11 and illustrates a case of two rows of the light-receiving element arrays 120. A lens parameter is the same as that in FIG. 14A. In FIG. 14B, arrangement of the light sources 103 with respect to the light-receiving lenses 11 and the light-receiving element arrays 120 arranged in two rows is illustrated. In the present embodiment, the light source 103 is arranged in a substantially center portion of two of the reading lines L. A portion different from the case of FIG. 14A is that, since an arrangement pitch of the light-receiving lenses 11 may be wider than a lens diameter, an arrangement pitch of the light sources 103 is also matched with an inter-lens distance, and the light sources 103 are arranged at positions which are substantially center portions between the light-receiving lenses 11 adjacent to each other and are substantially center portions of two rows of the reading lines L at the same time. This makes it possible to further prevent missing of a pixel on an inspection surface, and at the same time, it is possible to further reduce shading of the light-receiving lens 11 and light amount unevenness of the light source 103. A positional relationship between the light source 103 and an inspection surface is the same as that in the case of FIG. 14A A lens pitch between the light-receiving lenses 11 in each row is set to 7 mm. In this case, a substantial lens pitch is 3.5 mm.

Figure 14C:
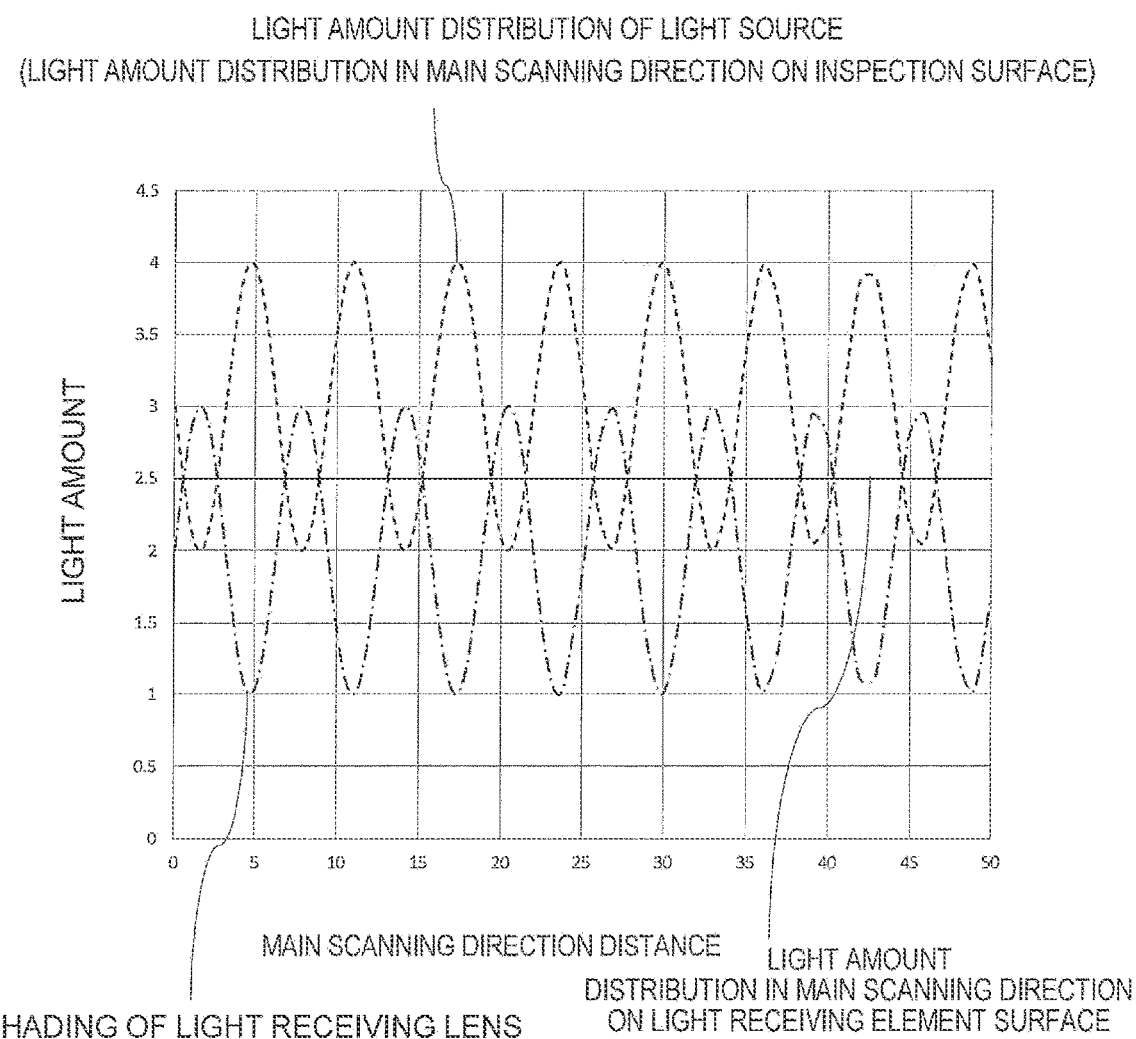
FIG. 14C is a diagram illustrating a relationship between light amount distribution of the light source (on an inspection surface), light amount distribution on a light-receiving element surface, and shading of alight-receiving lens in a main scanning direction.

FIG. 14C is a diagram illustrating a relationship between light amount distribution of the light source 103 (on an inspection surface), light amount distribution on a light-receiving element surface, and shading of the light-receiving lens 11 in the main scanning direction. In a layout of FIGS. 14A and 14B, light amount distribution on the light-receiving element array 120 becomes flat as schematically illustrated in FIG. 14C, and a dynamic range of the light-receiving element can be effectively used.

6. Method of Preventing Ripple

Next, as shading caused by each of the light-receiving lenses 11 generates a ripple with respect to the reading line L direction, which leads to narrowing of a dynamic range of a light-receiving element, a method for preventing the ripple will be described.

First, an inspection object is irradiated with illumination light having negative intensity distribution by an illumination system in advance. For example, a method of arranging the light source 103 between adjacent ones of the light-receiving lenses 11 is not a shading prevention method that completely supports various types of the light-receiving lenses 11. That is, if there is shading unique to each of the light-receiving lenses 11 and the light-receiving lenses 11 are different, it is necessary to use an illumination optical system corresponding the light-receiving lenses 11. In the present embodiment, the condenser lens 104 having large power is arranged in the main scanning direction. A light flux transmitted through the condenser lens 104 is then guided to an inspection object by a converging lens such as the cylindrical lens 105, and light intensity corresponding to shading of the light-receiving lens 11 is formed on the inspection object. Then, by appropriately changing a position of the condenser lens 104 in an optical axis direction according to shading of the light-receiving lens 11, for example, if an inspection object is a white reference plate for calibration, light intensity distribution on a light-receiving element can be smoothed. The condenser lens 104 may have power in the sub-scanning direction. In short, it is only necessary to completely prevent shading of the light-receiving lens 11 and, at the same time, to achieve effective light intensity distribution in consideration of a focal length of the light-receiving lens 11 with respect to an inspection object. That is, an optical element in which lens power in the main scanning direction is larger than lens power in the sub-scanning direction is preferable. As the condenser lens 104, for example, a cylindrical lens, a lenticular lens, a Fresnel lens, or a combination of a prism sheet and a spherical lens is preferable. As a positional relationship of the light source 103 with respect to the main scanning direction, the light source 103 may be arranged at an intermediate position of each of the light-receiving lenses 11 or may be arranged on an optical axis of the light-receiving lens 11. Furthermore, the light source 103 may be arranged at a position on an outer periphery of the light-receiving lens 11. Moreover, a lens having a power distribution in the main scanning direction is more preferable.

In the present embodiment, the condenser lens 104 that condenses a light flux from a plurality of the light sources 103 is provided as one lens body, and power in the main scanning direction of the lens body is larger than power in the sub-scanning direction. However, the condenser lens 104 may be configured to include a first condenser lens and a second condenser lens instead of a single lens body. In this case, in the first condenser lens, power in the main scanning direction may be larger than power in the sub-scanning direction, and in the second condenser lens, power in the sub-scanning direction may be larger than power in the main scanning direction. Further, power in the main scanning direction may be adjustable with the first condenser lens and the second condenser lens.

In the condenser lens 104 including the first condenser lens and the second condenser lens as described above, the first condenser lens and the second condenser lens can be constituted by a cylindrical lens, a lenticular lens, a Fresnel lens, a prism array, or the like. For example, the first condenser lens may be a lenticular lens or a prism array. Further, the second condenser lens may be a Fresnel lens or a cylindrical lens.

7. Parameter of Light-Receiving Lens

Figure 14D:
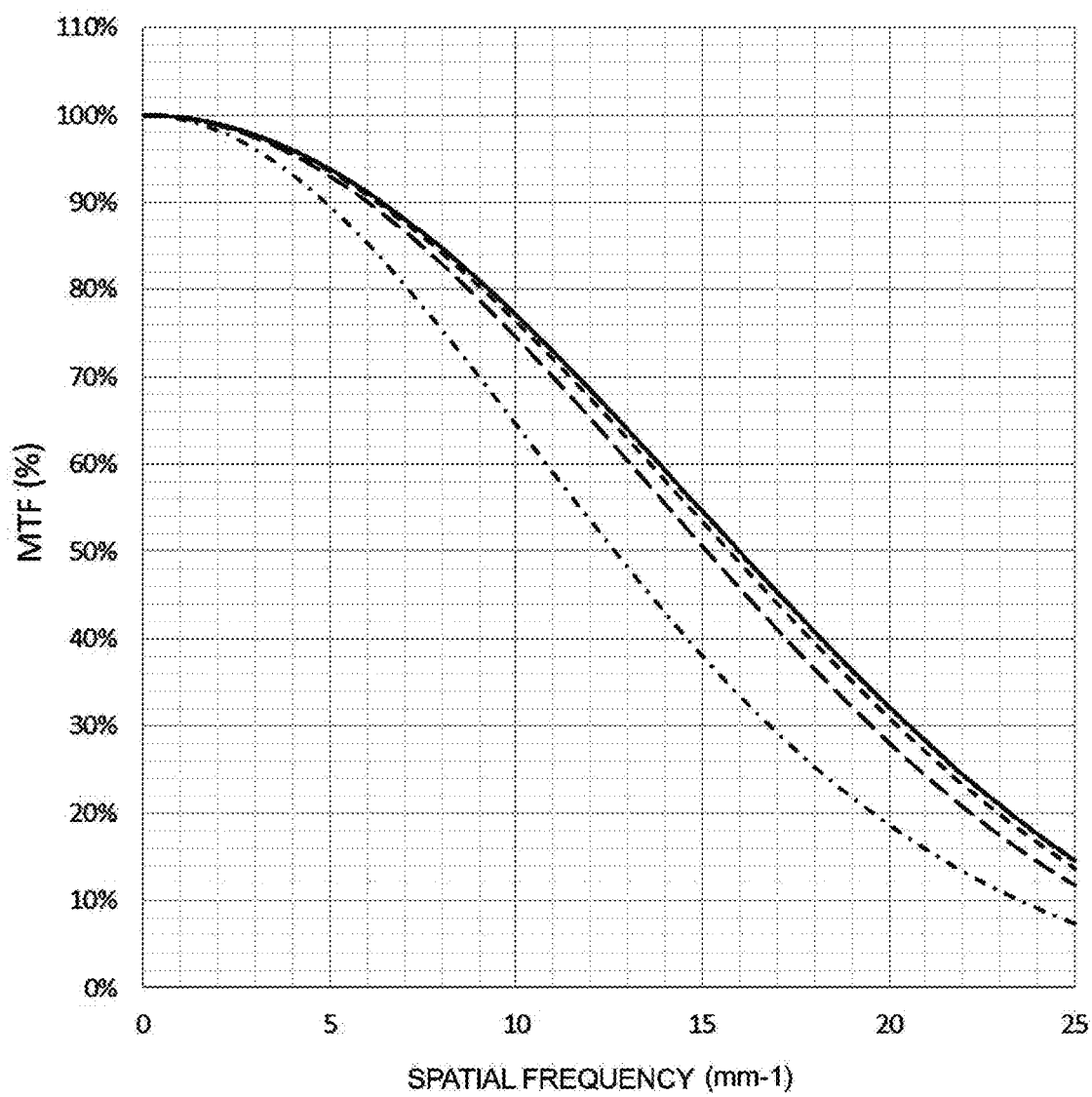
FIG. 14D is a graph ($\sqrt{A}=0.077$) of alight-receiving system MTF for each lens diameter.
Figure 14E:
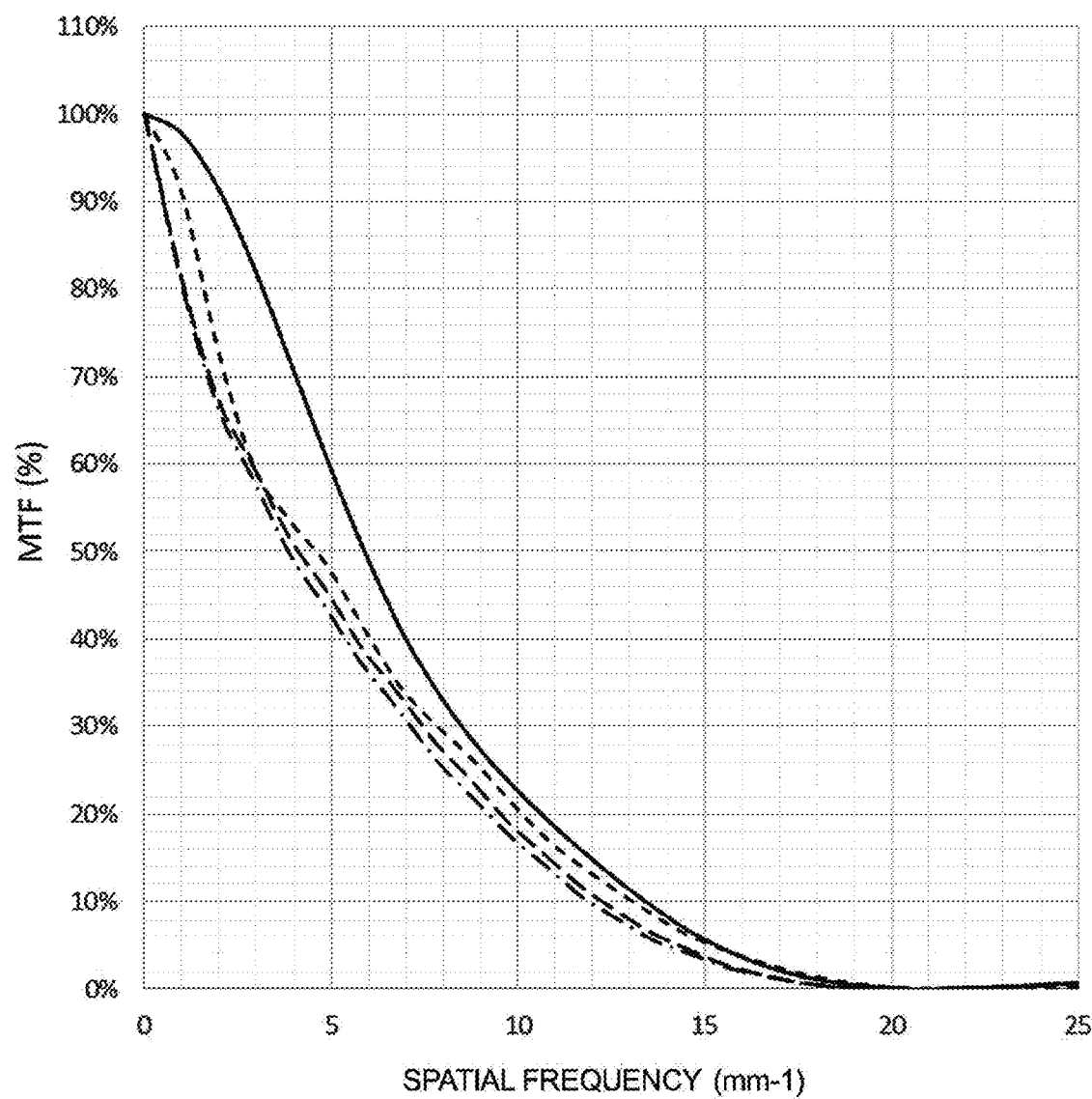
FIG. 14E is a graph ($\sqrt{A}=0.154$) of a light-receiving system MTF for each lens diameter.

A graph of a light-receiving system MTF for each lens diameter in the present embodiment is illustrated in FIG. 14D. As a comparative example, FIG. 14E illustrates a case of the refractive index distribution constant $\sqrt{A}=0.154$. Cases where the effective diameter $\Phi$ is $\Phi=1.0, 1.5, 2.0, 2.5,$ and $3.0$ mm are illustrated in the order of a solid line, a short-broken line, a long-broken line, and an alternate long and short dash line. Note that pixel dimension of a light-receiving element is set to 42.3 µm in both the main scanning direction and the sub-scanning direction corresponding to 600 dpi.

Figure 14F:
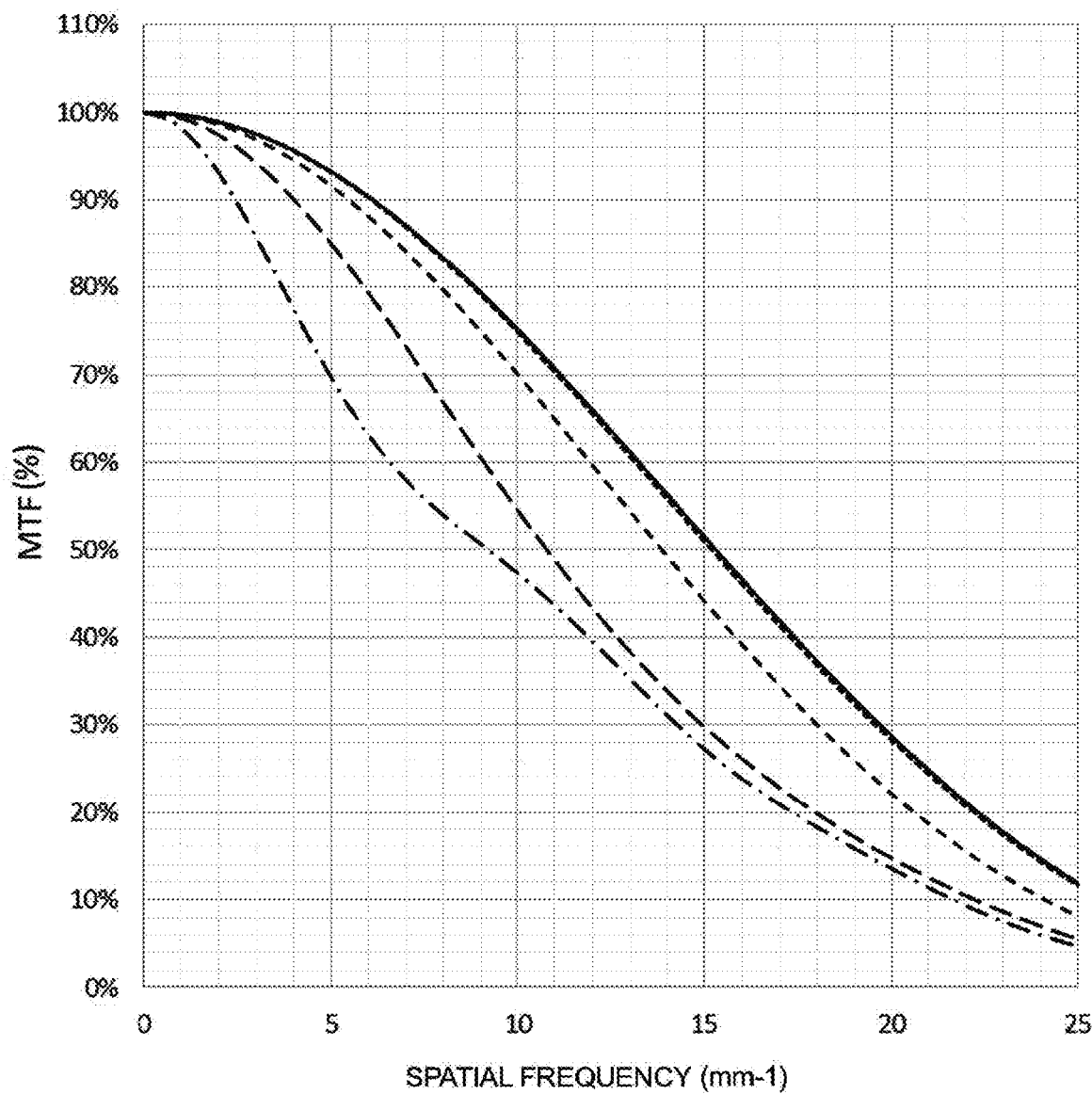
FIG. 14F is a graph of an MTF of a light-receiving optical system in which a refractive index distribution constant $\sqrt{A}$ is $\sqrt{A}=0.1027$.

In the present embodiment, in the effective diameter $\Phi$, under a condition that the refractive index distribution constant $\sqrt{A}$ is $\sqrt{A}=0.077$, if performance is about 30% at 12 lines/mm equivalent to 600 dpi, an MTF characteristic in a range of $\Phi 1.0$ mm to $\Phi 3.0$ mm is satisfied. On the other hand, the comparative example does not satisfy an MTF characteristic in all ranges with respect to the effective diameter $\Phi$. This indicates that an aberration characteristic is more excellent in a case where $\sqrt{A}$ is $\sqrt{A}=0.077$ than a case where $\sqrt{A}=0.154$. Further, in a case where the focal length $f=50$ mm, an MTF of a light-receiving optical system in a case where the refractive index distribution constant $\sqrt{A}$ is $\sqrt{A}=0.1027$ is obtained and is illustrated in FIG. 14F. According to FIG. 14F, even in a case where $\sqrt{A}$ is $\sqrt{A}=0.1027$, an MTF characteristic is satisfied in a range from $\Phi 1.0$ mm to $\Phi 3.0$ mm at 12 lines/mm corresponding to the resolution of 600 dpi.

In a case where the light-receiving lens 11 is a refractive index distribution type lens, the lens is preferably made from glass or resin. In this case, in a lens parameter of the light-receiving lens 11, an on-axis refractive index $N_0$ is preferably $1.45 \leq N_0 \leq 1.65$, the refractive index distribution constant $\sqrt{A}$ is preferably $0.05 \leq \sqrt{A} \leq 0.12$, and the focal length f is preferably 50 mm$\leq f \leq$150 mm.

The light-receiving lens 11 may be an achromatic or apochromatic lens in which a plurality of lenses is combined. In this case, a lens system in which only a convex lens is combined as a plurality of lenses may be used, or a lens system in which a convex lens and a concave lens are combined as a plurality of lenses may be used. Further, the focal length f of a plurality of lenses is preferably 50 mm$\leq f \leq$250 mm, and an aperture $\Phi$ of a plurality of lenses is preferably 2 mm$\leq \Phi \leq$10 mm.

Next, in order to improve a depth of field and resolution, a light-receiving lens system as a reduction optical system will be exemplified. A configuration of the optical system is similar to that in FIGS. 14A and 14B, and magnification of the light-receiving lens 11 is changed. That is, a relationship in lateral magnification between an object point and an image point of the light-receiving lens 11 is changed to 9:1, 4:1, or the like. In this manner, a depth of field is increased to three times that in the equal magnification system in a case where the lateral magnification is 9-1, and is increased to two times that in the equal magnification system in a case where the lateral magnification is 4:1. In a case where a depth of field is set to three times as large, size of a light-receiving element is set to ⅑ of size of a light-receiving element in the equal magnification system. Further, in a case where a depth of field is set to two times as large, size of a light-receiving element is set to ¼ of size of a light-receiving element in the equal magnification system. In the present embodiment, a light-receiving element having size of ¼ is used, and a depth of field set to two times as large.

Figure 15:
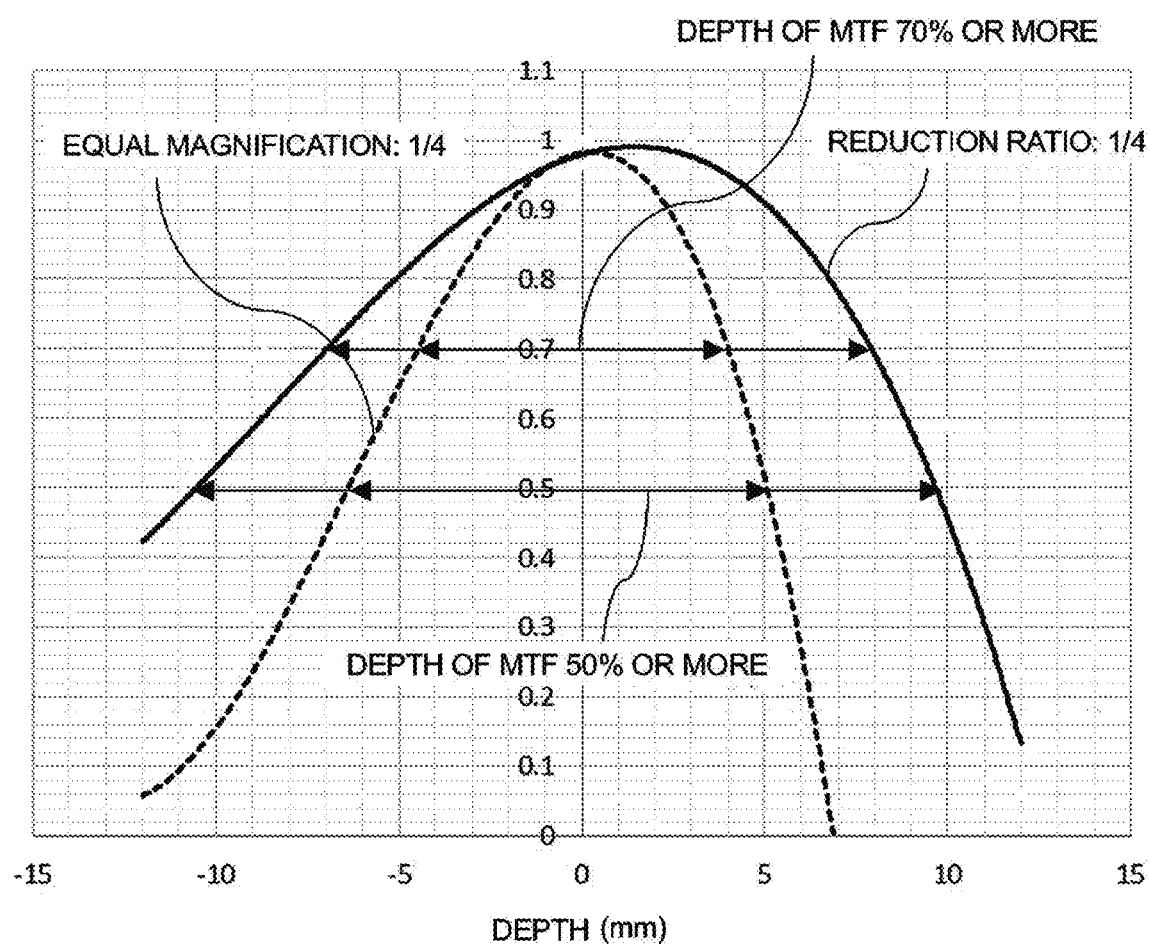
FIG. 15 is a graph showing an MTF characteristic at the time of defocusing.

An MTF characteristic at the time of defocusing of a reduction optical system in the present embodiment is illustrated in a graph (solid line) of FIG. 15. As a comparative example, an MTF characteristic at the time of defocusing in the equal magnification system is illustrated in a graph (broken line) of FIG. 15. Comparison between the reduction system and the equal magnification system in the diagram shows that a depth of field of the reduction optical system is about twice larger than that of the equal magnification system. Further, if a reduction ratio is S, N.A. of the light-receiving lens 11 is increased by 1/S which is a reciprocal of S. For this reason, even in a case where a lens diameter of the light-receiving lens 11 is small, if a reduction ratio is increased according to a focal length, effective N.A. is maintained, so that blurring due to a diffraction effect can be made constant.

In the present embodiment, since the focal length is f=50 mm and the lateral magnification ratio is ¼, it is possible to use up to Φ=0.25 mm for the lens diameter Φ in principle. Since the same lens as in FIGS. 14A and 14B is used, the lens diameter Φ is Φ=4 mm and the effective diameter Φ' is Φ'=2.5 mm. N.A. is 4 times as large as that in the case of the equal magnification system in FIGS. 14A and 14B. Therefore, an amount of received light becomes 16 times as large, and it is possible to offset decrease of 1/16 in an amount of received light due to the reduction in the size of the light-receiving element to ¼.

8. Method of Preventing Crosstalk

Figure 16A:
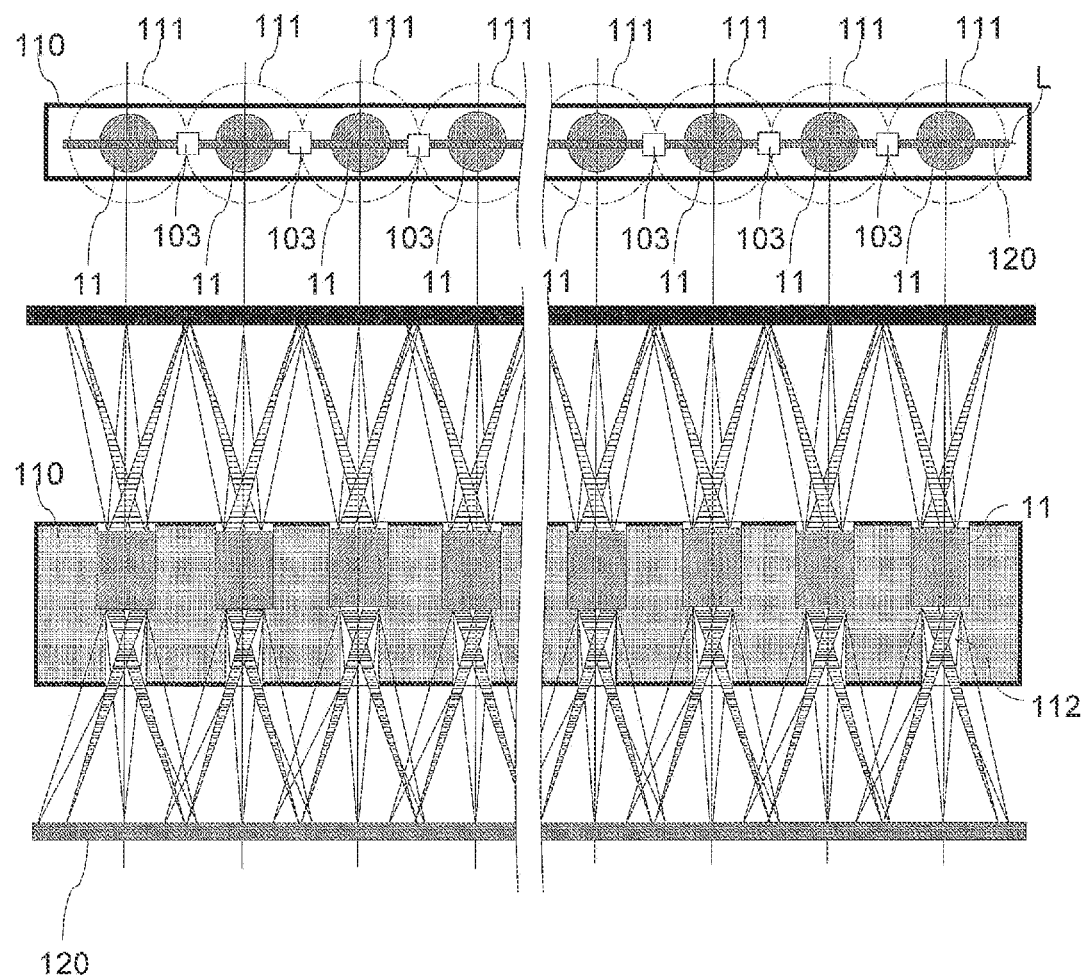
FIG. 16A is a diagram illustrating a lens holder for explaining a crosstalk prevention method in the one-row separated lens array system in FIG. 14A and illustrates a schematic diagram in a case where a visual field is limited by a cylindrical aperture.

In the case of FIG. 14A, a method of preventing occurrence of crosstalk due to superimposition of the visual fields 111 will be described. In the case of FIG. 14A, the lens diameter Φ is Φ=4 mm, and it is used by being accommodated in the lens holder 110. In view of the above, FIG. 16A illustrates a configuration of a visual field limiting holder in which the light-receiving element array 120 side of the lens holder 110 is extended in a cylindrical shape. An effect of the configuration will be described below.

Figure 16B:
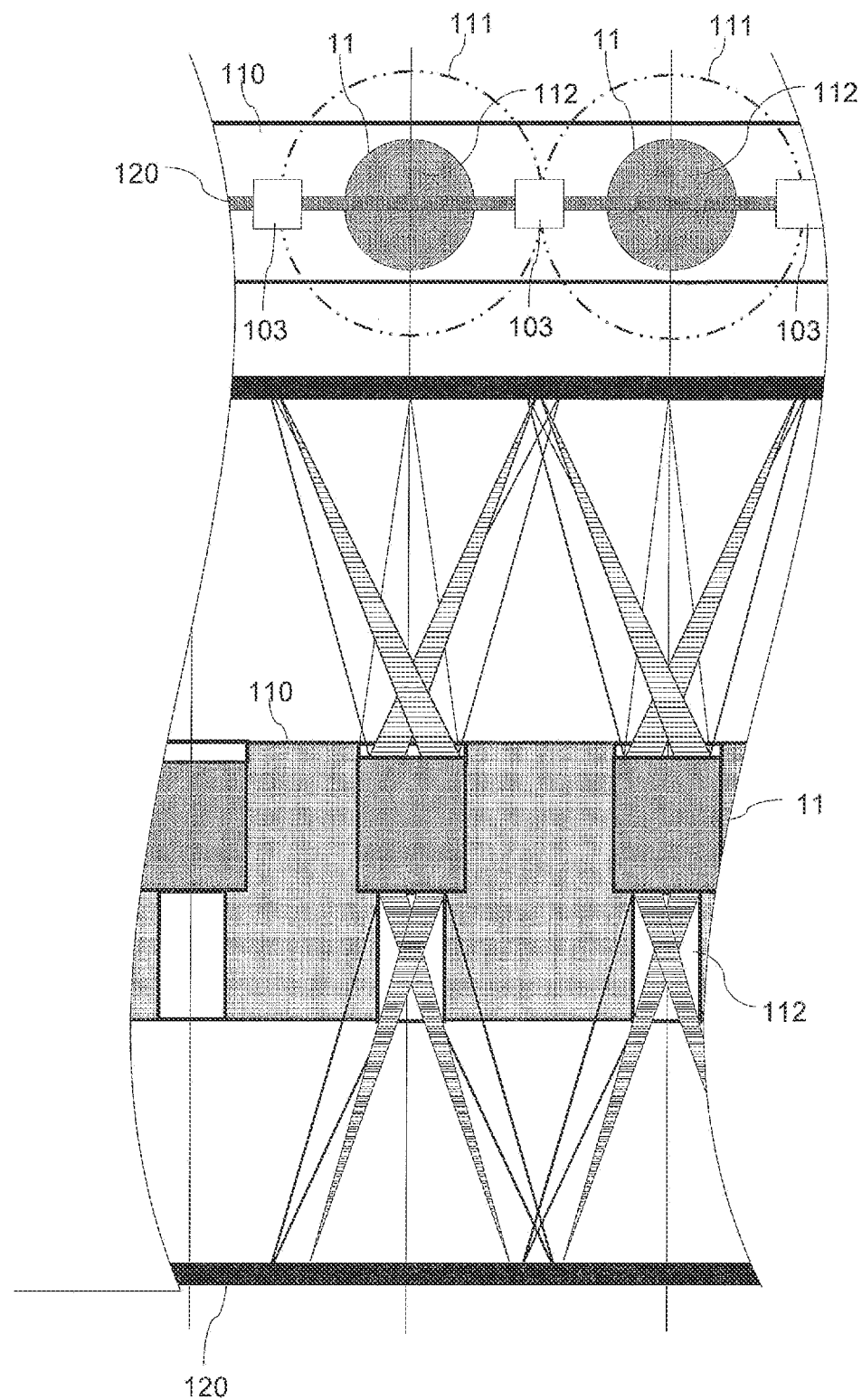
FIG. 16B is a detailed diagram of a cylindrical visual field limiting aperture illustrated in FIG. 16A.

A detailed diagram is illustrated in FIG. 16B. A plurality of the light-receiving lenses 11 are inserted into the lens holder 110, and an aperture 112 including a through hole is formed on the light-receiving element array 120 side of each of the light-receiving lenses 11. An outer diameter of a plurality of the light-receiving lenses 11 is a clearance fit dimension with respect to an inner diameter of the lens holder 110, and clearance fitting is performed by inserting each of the light-receiving lenses 11 into the lens holder 110. Each of the apertures 112 has an inner diameter smaller than an outer diameter of each of the light-receiving lenses 11 and extends along an optical axis of each of the light-receiving lenses 11. That is, the side of a plurality of the light-receiving elements (the fight-receiving element array 120 side) of the lens holder 110 is extended in a cylindrical shape by each of the apertures 112, so that the visual field 111 of each light-receiving lens 11 is limited. The cylindrical shape means a configuration in which the aperture 112 is extended by a through hole formed in a cylindrical shape, but is not limited to this configuration, and the aperture 112 may be extended in a flat plate shape by a protruding flat plate. Between adjacent ones of the light-receiving lenses 11, lengths on the side of a plurality of light-receiving elements (the light-receiving element array 120 side) of the lens holder 110, that is, lengths of the apertures 112 may be different.

Since a light flux indicated by hatching in FIG. 16B is within the visual field 111, the light flux is not limited in the visual field by the aperture 112 and can be received by the light-receiving element array 120, but a light flux outside the visual field 111 (outside with respect to an optical axis of the light-receiving lens 11) does not reach the light-receiving element array 120. That is, a light flux within the visual field 111 of the light-receiving lens 11 reaches a light-receiving element facing the light-receiving lens 11, but a light flux outside the visual field 111 does not reach any of a light-receiving element facing the light-receiving lens 11 and an adjacent light-receiving element. In other words, in a case of focusing on a light-receiving element, a light flux other than the visual field 111 of the light-receiving lens 11 facing the light-receiving element does not reach the light-receiving element, and thus, it is possible to prevent crosstalk between adjacent pixels. Furthermore, since the aperture 112 is formed in the lens holder 110, a highly accurate crosstalk prevention aperture can be realized.

In a plurality of the apertures 112, an aperture diameter of each of them may be changed one by one, and missing of a detection pixel on an inspection surface between adjacent pixels can be prevented by using a pair of the apertures 112 having different diameters. That is, in a case of focusing on an optional aperture, for example, in the present embodiment, by setting the aperture diameter Φ to Φ=2.4 mm and setting the aperture diameters Φ' adjacent to each other to Φ'=2.6 mm, it is possible to prevent missing of a detection pixel between adjacent pixels. The aperture 112 does not need to have a cylindrical shape. For example, a partition may be provided at an intermediate position between the light-receiving lenses 11 to prevent light received by the light-receiving lenses 11 from being received by another one of the light-receiving lenses 11.

Further, a plurality of the light-receiving lenses 11 is not limited to those in a configuration of being arranged in a row, and may be arranged in a trefoil stacking shape by inserting and fixing a single one of the light-receiving lenses 11 into a cylindrical holder in advance and then stacking the cylindrical holders in a trefoil shape. Further, a plurality of the light-receiving lenses 11 may be positioned by an L-shaped positioning jig, bonded and fixed, and then stored in a rectangular lens holder.

The aperture 112 is provided on the light-receiving element array 120 side, but may be provided on an inspection surface side with a length that does not impair W.D. Then, a combination of an aperture on the inspection surface side and an aperture on the light-receiving element side enables more effective visual field limitation.

Figure 17A:
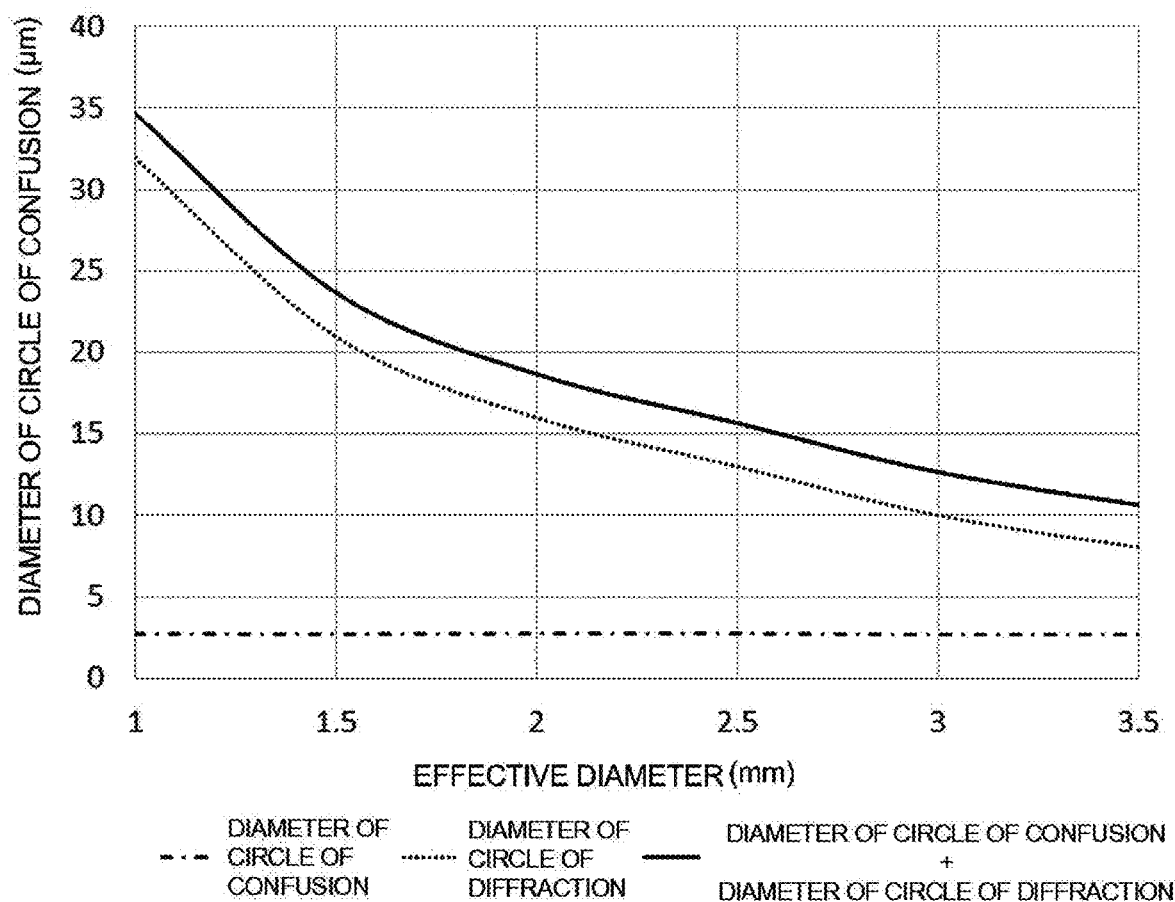
FIG. 17A is a graph ($\sqrt{A}=0.154$) showing a relationship between an effective diameter and a diameter of a circle of confusion in a case where a focal length f is f=100 mm.
Figure 17B:
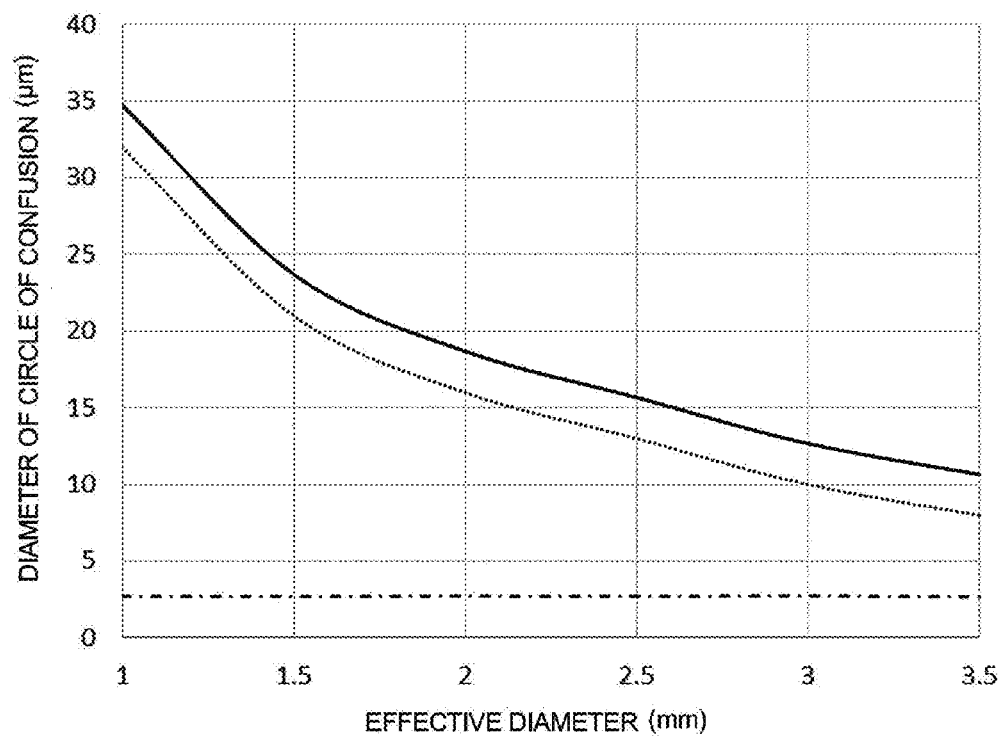
FIG. 17B is a graph ($\sqrt{A}=0.1027$) showing a relationship between an effective diameter and a diameter of a circle of confusion in a case where the focal length f is f=100 mm.
Figure 17C:
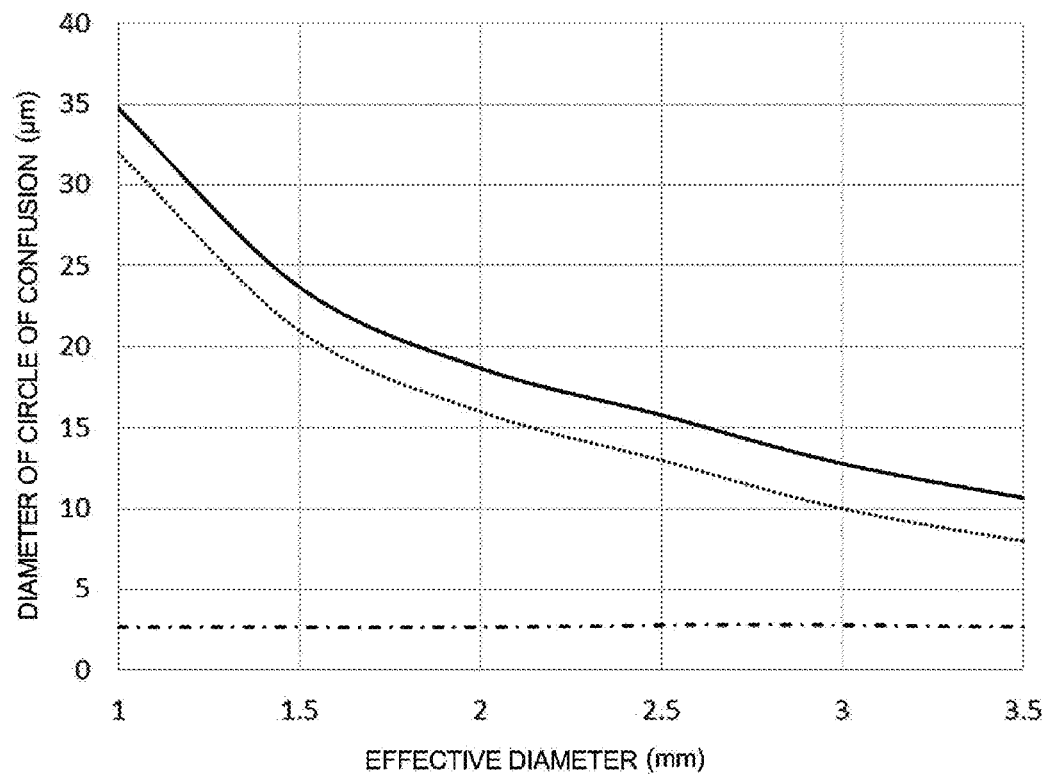
FIG. 17C is a graph ($\sqrt{A}=0.077$) showing a relationship between an effective diameter and a diameter of a circle of confusion in a case where the focal length f is f=100 mm.

FIGS. 17A to 17C illustrate a relationship between an effective diameter and a diameter of a circle of confusion in a case where the focal length f is f=100 mm. The effective diameter Φ is in the same aspect as that in the case of FIG. 14A. FIG. 17A illustrates a case of √A=0.154, FIG. 17B illustrates a case of √A=0.1027, and FIG. 17C illustrates a case of √A=0.077. In FIGS. 17A to 17C, a solid line indicates a total circle of confusion, a broken line indicates a circle of confusion due to diffraction, and an alternate long and short dash line indicates a geometric optical circle of confusion. Note that, in any of FIGS. 17A to 17C, $N_0$ is $N_0$=1.654. According to each of FIGS. 17A to 17C, it can be seen that even in a case where the focal length f is f=100 mm, when the effective diameter Φ is Φ≥1.5 mm, a diameter of a circle of confusion including diffraction is much smaller than about 43 μm of a case where resolution is aimed at 600 dpi.

DESCRIPTION OF REFERENCE SIGNS 10 light source unit
11 light-receiving lens 12 light-receiving unit
20 focal plane
103 light source
104 condenser lens
105 cylindrical lens
110 lens holder
111 visual field
112 aperture
120 light-receiving element array
131 red LD
132 green LD
133 blue LD
134 light source substrate
135 heat sink

The invention claimed is:

1. An optical line sensor that reads an inspection object conveyed in a sub-scanning direction by a reading line extending in a main scanning direction, the optical line sensor comprising:
a plurality of light-receiving lenses arranged along the main scanning direction; and
a plurality of light-receiving elements that are arranged linearly along the main scanning direction and receive light transmitted through the plurality of light-receiving lenses;
wherein the plurality of light-receiving lenses are arranged to be separated from each other by a diameter of the light-receiving lens or larger; and
wherein the plurality of light-receiving elements form at least one row of the reading lines.

2. The optical line sensor according to claim 1, wherein:
the plurality of light-receiving lenses form an erected image or an inverted image.

3. The optical line sensor according to claim 2, wherein:
the plurality of light-receiving lenses are (i) arranged to be separated from each other by a visual field dimension of the light-receiving lens or smaller, or (ii) arranged to be separated from each other by a visual field dimension of the light-receiving lens or larger; and
the plurality of light-receiving elements form at least two rows of the reading lines.

4. The optical line sensor according to claim 2, wherein:
the plurality of light-receiving elements are arranged in one row of an array to constitute one light-receiving element array; and
the plurality of light-receiving lenses are separated from each other by a diameter of the light-receiving lens or larger and are arranged to be separated from each other by a visual field dimension of the light-receiving lens or smaller.

5. The optical line sensor according to claim 2, wherein:
the plurality of light-receiving elements are arranged in two rows or more of arrays to constitute a plurality of light-receiving element arrays;
each of the plurality of light-receiving element arrays is (i) arranged to be separated from each other by a diameter of the light-receiving lens or larger in a direction orthogonal to the reading line and to be separated from each other by a visual field dimension of the light-receiving lens or less, or (ii) arranged to be separated from each other by a visual field dimension of the light-receiving lens or larger in a direction orthogonal to the reading line; and
the plurality of light-receiving lenses are arranged as many as the plurality of light-receiving element arrays, and an optical axis of each of the light-receiving lenses penetrates a substantially center portion of each of the light-receiving element arrays.

6. The optical line sensor according to claim 5, wherein:
the plurality of light-receiving element arrays are light-receiving element arrays shorter than a plurality of reading lines arranged in two rows of reading lines, and light-receiving element arrays arranged in one reading line and light-receiving element arrays arranged in another reading line are alternately arranged in a staggered manner along the main scanning direction.

7. The optical line sensor according to claim 6, wherein:
the plurality of light-receiving lenses are arranged in one row in parallel to the plurality of light-receiving element arrays between the two rows of reading lines; and
an optical axis of each light-receiving lens penetrates a substantially center portion in the sub-scanning direction between the two rows of reading lines.

8. The optical line sensor according to claim 2, wherein:
each of the plurality of light-receiving lenses includes a refractive index distribution type lens that forms an erected image or an inverted image, an achromatic lens, or an apochromatic lens.

9. The optical line sensor according to claim 8, wherein:
the refractive index distribution type lens is made from glass or resin, and in a lens parameter of the lens, an on-axis refractive index No is $1.45 \leq N_0 \leq 1.65$, a refractive index distribution constant $\sqrt{A}$ is $0.05 \leq \sqrt{A} \leq 0.12$, and a focal length f is 50 mm$\leq f \leq$150 mm.

10. The optical line sensor according to claim 8, wherein:
each of the plurality of light-receiving lenses includes an achromatic or an apochromatic lens obtained by combining a plurality of lenses, the plurality of light-receiving lenses being a lens system obtained by combining only a convex lens as the plurality of lenses, or a lens system obtained by combining a convex lens and a concave lens as the plurality of lenses.

11. The optical line sensor according to claim 1, further comprising:
a plurality of light sources that irradiate an inspection object with light; and
a condenser lens that condenses a light flux from the plurality of light sources;
wherein the plurality of light sources are arranged in parallel to the reading line, an optical axis of the plurality of light sources is arranged at an optional position on a virtual plane that forms an intersection with an optical axis of the plurality of light-receiving lenses and intersects an optical axis of the plurality of light-receiving lenses, and the light source is arranged at a substantially center portion between light-receiving lenses adjacent to each other; and
wherein the plurality of light sources includes a plurality of light sources having different wavelengths, and, with the light sources having different wavelengths as one unit, light sources of the one unit are arranged in the main scanning direction.

12. The optical line sensor according to claim 11, wherein:
the condenser lens includes a first condenser lens in which power in the main scanning direction is larger than power in the sub-scanning direction, and a second condenser lens in which power in the sub-scanning direction is larger than power in the main scanning direction; and
wherein in the condenser lens, power in the main scanning direction is adjustable by the first condenser lens and the second condenser lens, or the condenser lens is a single lens body, and power in the main scanning direction of the lens body is larger than power in the sub-scanning direction.

13. The optical line sensor according to claim 12, wherein:
the condenser lens is a cylindrical lens or a Fresnel lens, or the first condenser lens is a lenticular lens or a prism array, and the second condenser lens is a Fresnel lens or a cylindrical lens.

14. The optical line sensor according to claim 11, wherein:
the plurality of light sources includes (i) a white LED, or (ii) a red LED, a green LED, and a blue LED, or (iii) a laser diode.

15. The optical line sensor according to claim 1, further comprising:
a lens holder that holds the plurality of light-receiving lenses; and
wherein a side of the plurality of light-receiving elements of the lens holder is extended in a cylindrical shape or a flat plate shape, so that a visual field of each light-receiving lens is limited.

16. The optical line sensor according to claim 15, wherein:
lengths on the sides of the plurality of light-receiving elements of the lens holder are different between adjacent ones of the light-receiving lenses.

17. An image synthesis processing method using the optical line sensor according to claim 1, the image synthesis processing method comprising the steps of:
performing subtraction processing on pixel output from a light-receiving element in a portion where visual fields of the plurality of light-receiving lenses overlap.

18. An image synthesis processing method using the optical line sensor according to claim 2, the image synthesis processing method comprising the steps of:
performing image synthesis processing after inverting an inverted image of the plurality of light-receiving lenses to convert the inverted image into an erected image.

* * * * *